US012253753B2

(12) United States Patent
Wang et al.

(10) Patent No.: US 12,253,753 B2
(45) Date of Patent: Mar. 18, 2025

(54) DISPLAY PANEL AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Jiaxing Wang, Beijing (CN); Feng Liu, Beijing (CN); Xiaojuan Wu, Beijing (CN); Jian Wang, Beijing (CN); Yao Bi, Beijing (CN); Jinshuai Duan, Beijing (CN); Cuiyu Chen, Beijing (CN); Yu Zhao, Beijing (CN); Dawei Feng, Beijing (CN); Zhiqiang Yu, Beijing (CN); Danxing Hou, Beijing (CN); Ning Wang, Beijing (CN); Mingjing Liu, Beijing (CN); Yichi Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/554,978

(22) PCT Filed: Oct. 26, 2022

(86) PCT No.: PCT/CN2022/127721
§ 371 (c)(1),
(2) Date: Oct. 11, 2023

(87) PCT Pub. No.: WO2023/072151
PCT Pub. Date: May 4, 2023

(65) Prior Publication Data
US 2024/0201535 A1    Jun. 20, 2024

(30) Foreign Application Priority Data
Oct. 29, 2021   (CN) .................. 202111276051.3

(51) Int. Cl.
*G02F 1/1335*    (2006.01)
*G02F 1/135*    (2006.01)

(52) U.S. Cl.
CPC .. *G02F 1/133531* (2021.01); *G02F 1/133545* (2021.01); *G02F 1/133555* (2013.01); *G02F 1/1351* (2021.01)

(58) Field of Classification Search
CPC ......... G02F 1/133531; G02F 1/133545; G02F 1/1351; G02F 1/133555
See application file for complete search history.

(56) References Cited

U.S. PATENT DOCUMENTS 6,181,399 B1 *   1/2001   Odoi ................ G02F 1/133528
                                              349/96
6,211,933 B1    4/2001   Mizunuma et al.
(Continued)

FOREIGN PATENT DOCUMENTS

CN    101189545 A    5/2008
CN    104504661 A    4/2015
(Continued)

*Primary Examiner* — Nathanael R Briggs
(74) *Attorney, Agent, or Firm* — IPro, PLLC

(57) ABSTRACT

A display panel includes a liquid crystal cell, a first polarizing assembly and a second polarizing assembly. The liquid crystal cell includes a first substrate and a second substrate disposed opposite to each other, and a liquid crystal layer disposed between the first substrate and the second substrate. The first polarizing assembly is disposed on a side of the first substrate further away from the liquid crystal layer and includes at least a first polarizing layer having a first transmission axis, and the first polarizing assembly is configured for generating polarized light whose polarization direction is parallel to the first transmission axis. The second polarizing assembly is located on a side of the second substrate further away from the liquid crystal layer and (Continued)

includes at least a transflective layer and a light absorbing layer.

15 Claims, 17 Drawing Sheets

(56) References Cited

U.S. PATENT DOCUMENTS

| | | | |
|---|---|---|---|
| 2007/0014009 A1 | 1/2007 | Cross et al. | |
| 2018/0149917 A1* | 5/2018 | Wang | G02F 1/133536 |
| 2018/0149918 A1 | 5/2018 | Yuan et al. | |
| 2019/0339433 A1* | 11/2019 | Benoit | G02B 5/3066 |
| 2023/0089004 A1 | 3/2023 | Liu et al. | |

FOREIGN PATENT DOCUMENTS

| | | |
|---|---|---|
| CN | 104570466 A | 4/2015 |
| CN | 105446001 B | 9/2018 |
| CN | 110023798 B | 11/2020 |
| CN | 106526951 B | 1/2021 |
| CN | 212623464 U | 2/2021 |
| CN | 113805375 A | 12/2021 |
| CN | 113985643 A | 1/2022 |

* cited by examiner

DISPLAY PANEL AND DISPLAY APPARATUS

The present disclosure is a US national stage of international application No. PCT/CN2022/127721, filed on Oct. 26, 2022, which claims priority to Chinese patent application No. 202111276051.3, filed on Oct. 29, 2021 and entitled "display panel and display apparatus", the entire content of which is incorporated herein by reference.

TECHNICAL FIELD

The present application relates to the field of display technologies, in particular to a display panel and display apparatus.

BACKGROUND OF THE INVENTION

Reflective liquid crystal displays (LCD) are widely used in small display apparatus such as smart wear and electronic price tags, and have great prospects.

In an outdoor display scene, ambient brightness is usually highlighted, and the traditional display requires the display apparatus to have high brightness, which results in high power consumption of the display product. If reflective products are used, the power consumption of products can be greatly reduced when the ambient light brightness is very high.

SUMMARY OF THE INVENTION

The present application provides a display panel and a display apparatus, and the technical solution are as follows.

In an aspect, a display panel is provided and the display panel includes:
- a liquid crystal cell, where the liquid crystal cell includes a first substrate and a second substrate disposed opposite to each other, and a liquid crystal layer disposed between the first substrate and the second substrate;
- a first polarizing assembly, where the first polarizing assembly is disposed on a side of the first substrate further away from the liquid crystal layer and includes at least a first polarizing layer having a first transmission axis, and the first polarizing assembly is configured for generating polarized light whose polarization direction is parallel to the first transmission axis; and
- a second polarizing assembly, where the second polarizing assembly (103) is located on a side of the second substrate further away from the liquid crystal layer and includes at least a transflective layer and a light absorbing layer, the transflective layer is closer to the liquid crystal cell than the light absorbing layer, the transflective layer has a second transmission axis and the transflective layer (1031) is configured for transmitting polarized light whose polarization direction is parallel to the second transmission axis and for reflecting polarized light whose polarization direction is perpendicular to the second transmission axis, and the light absorbing layer is configured for absorbing polarized light transmitted by the transflective layer.

Optionally, the first polarizing assembly further includes:
- a first adhesive layer located on a side of the first polarizing layer closer to the liquid crystal cell;
- a first protective layer located between the first adhesive layer and the first polarizing layer; and
- a second protective layer located on a side of the first polarizing layer further away from the liquid crystal cell; and
- where the first adhesive layer is configured to bond the first protective layer to the first substrate, and the first protective layer and the second protective layer are configured to protect two surfaces of the first polarizing layer, respectively.

Optionally, the light absorbing layer is a second polarizing layer having an absorption axis and a third transmission axis, and the absorption axis is parallel to the second transmission axis and the third transmission axis is perpendicular to the second transmission axis.

Optionally, the second polarizing assembly further includes:
- a second adhesive layer located on a side of the transflective layer closer to the liquid crystal cell;
- a third adhesive layer located between the transflective layer and the second polarizing layer;
- a third protective layer located between the third adhesive layer and the second polarizing layer; and
- a fourth protective layer located on a side of the second polarizing layer further away from the liquid crystal cell; and
- where the second adhesive layer is configured to bond the transflective layer to the second substrate, the third adhesive layer is configured to bond the transflective layer to the third protective layer, and the third protective layer and the fourth protective layer are configured to protect two surfaces of the second polarizing layer, respectively.

Optionally, the display panel further includes a first light source assembly located on a side of the second polarizing assembly further away from the liquid crystal cell; and
- one of the second polarizing layer and the transflective layer has a plurality of openings, which are configured for transmitting light of the first light source assembly.

Optionally, the second polarizing layer has the plurality of openings; the plurality of openings in the second polarizing layer are configured for transmitting light emitted from the first light source assembly, and the transflective layer is configured for generating polarized light parallel to the second transmission axis based on light transmitted through the plurality of openings.

Optionally, the transflective layer has the plurality of openings; the second polarizing layer is configured to generate polarized light with a polarization direction parallel to the third transmission axis based on light emitted from the first light source assembly, and the plurality of openings in the transflective layer are configured for transmitting polarized light with a polarization direction parallel to the third transmission axis.

Optionally, the display panel further includes an array substrate having a plurality of pixel circuits, the array substrate has a plurality of pixel regions, each of the plurality of pixel regions includes a display area as well as a non-display area, each of the pixel circuits is disposed in the non-display area, and an orthographic projection in the array substrate of each the plurality of openings is in one of the plurality of pixel regions.

Optionally, a material of the light absorbing layer includes a light absorbing material, and the light absorbing material includes black ink.

Optionally, the second polarizing assembly further includes:
- a second adhesive layer disposed on a side of the transflective layer proximate to the liquid crystal cell; and
- where the second adhesive layer is configured to bond the transflective layer to the second substrate.

Optionally, a side of the first polarizing assembly further away from the liquid crystal cell is an out-light surface of the display panel, and at least one adhesive layers between the transflective layer and the out-light surface is subjected to a haze treatment.

Optionally, the adhesive layers between the transflective layer and the out-light surface of the display panel includes the first adhesive layer and the second adhesive layer; and
  a material of the first adhesive layer includes at least diffusion powder or a material of the second adhesive layer includes at least the diffusion powder or a material of both the first adhesive layer and the second adhesive layer includes at least the diffusion powder.

Optionally, the transflective layer includes a first dielectric layer and a second dielectric layer which are alternately stacked in sequence;
  the first dielectric layer has a first refractive index for polarized light whose polarization direction is parallel to the second transmission axis, the first dielectric layer has a second refractive index for polarized light whose polarization direction is perpendicular to the second transmission axis, and the first refractive index being equal to the second refractive index; and
  the second dielectric layer has a third refractive index for polarized light whose polarization direction is parallel to the second transmission axis, the second dielectric layer has a fourth refractive index for polarized light whose polarization direction is perpendicular to the second transmission axis, the third refractive index and the fourth refractive index are unequal, and the third refractive index are equal to the first refractive index.

Optionally, the liquid crystal cell is a twisted nematic liquid crystal cell, or the liquid crystal cell is a planar translation liquid crystal cell, or the liquid crystal cell is a multi-quadrant vertically oriented liquid crystal cell.

Optionally, the first polarizing assembly is closer to an incoming light side than the second polarizing assembly; and
  the light on the incoming light side includes external ambient light, and/or, light emitted from a second light source assembly included in the display panel; and the second light source assembly of the display panel is located on a side of the first polarizing assembly further away from the liquid crystal cell.

In another aspect, a display apparatus is provided, and the display apparatus includes a power supply assembly and a display panel as described in the above aspect; and the power supply assembly is configured to power the display panel.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE INVENTION

For clearer descriptions of the objectives, technical solutions, and advantages of the present disclosure, the present disclosure is further described in detail hereinafter in combination with the accompanying drawings.

Currently, a reflective display panel is provided with a reflective metal layer at a position of a backlight source to reflect external ambient light for display, and then a polarizer composed of a PVA, a ½ λ wave plate, and a ¼ λ wave plate is used. However, due to the dispersivity of light, the ½ λ wave plate and ¼ λ wave plate cannot rotate all visible light by 90°, and some light is still emitted in the dark state, resulting in low contrast of the reflective display panel (generally is several tens). A design of angle of the ½ λ wave plate and ¼ λ wave plate is complex, the structure is changeable, the polarizer manufacturer is difficult to respond, and the cost of the polarizer is high.

Figure 1:
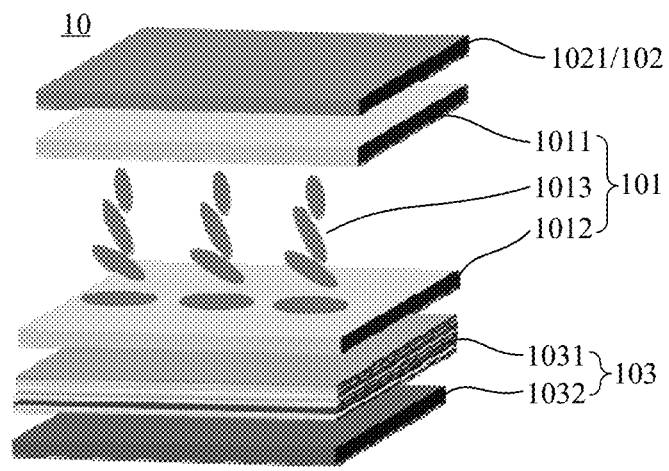
FIG. 1 is a structural schematic diagram of a display panel provided by an embodiment of the present application.

FIG. 1 is a structural schematic diagram of a display panel provided by an embodiment of the present application. Referring to FIG. 1, it can be seen that a display panel 10 may include a liquid crystal cell 101, a first polarizing assembly 102 and a second polarizing assembly 103. The liquid crystal cell 101 may include a first substrate 1011 and a second substrate 1012 disposed opposite to each other, and a liquid crystal layer 1013 between the first substrate 1011 and the second substrate 1012.

The first polarizing assembly 102 is located on a side of the first substrate 1011 further away from the liquid crystal layer 1013. The first polarizing assembly 102 at least includes a first polarizing layer 1021, the first polarizing layer 1021 may have a first transmission axis, and the first polarizing assembly 102 is configured to generate polarized light with a polarization direction parallel to the first transmission axis (the polarized light may be linearly polarized light). For example, after external ambient light (which may also be referred to as natural light) or light emitted by a second light source assembly located on a display side of the display panel 10 irradiates the first polarizing assembly 102, the first polarizing assembly 102 may convert the light into polarized light with a polarization direction parallel to the first transmission axis. The display side of the display panel 10 is a side of the liquid crystal cell 101 closer to the first polarizer assembly 102.

The second polarizing assembly 103 may be located on a side of the second substrate 1012 further away from the liquid crystal layer 1013. The second polarizing assembly 103 at least includes a transflective layer 1031 and a light absorbing layer 1032. The transflective layer 1031 is closer to the liquid crystal cell 101 than the light absorbing layer 1032. The transflective layer 1031 has a second transmission axis and is configured for transmitting polarized light with a polarization direction parallel to the second transmission axis and for reflecting polarized light with a polarization direction perpendicular to the second transmission axis. The light absorbing layer 1032 is configured to absorb the polarized light transmitted by the transflective layer 1031.

After the first polarizing assembly 102 converts the light into polarized light with a polarization direction parallel to the first transmission axis, the polarized light may be irradiated to the second polarizing assembly 103 via the liquid crystal cell 101. After passing through the liquid crystal cell 101, the polarization direction of the polarized light may or may not change (the polarized light after passing through the liquid crystal cell 101 may be linearly polarized light, elliptically polarized light, or circularly polarized light). No matter whether the polarization direction is changed or not, if the polarization direction of the polarized light irradiated to the transflective layer 1031 of the second polarizing assembly 103 is parallel to the second transmission axis of the transflective layer 1031, the polarized light can be transmitted through the transflective layer 1031 and then irradiated to the light absorbing layer 1032 to be absorbed by the light absorbing layer 1032, and is in a dark state. If the polarization direction of the polarized light irradiated to the transflective layer 1031 of the second polarizing assembly 103 is not parallel to (for example, perpendicular to) the second transmission axis of the transflective layer 1031, the polarized light will be reflected by the transflective layer 1031, and the light can be emitted from the display side of the display panel and is in a bright state.

In the embodiments of the present application, the transflective layer 1031 can realize the functions of transmitting light as well as reflecting light. For example, the transflective layer 1031 may transmit light whose polarization direction is parallel to the second transmission axis and may reflect light whose polarization direction is perpendicular to the second transmission axis. Optionally, the transflective layer 1031 may be a half-transmissive and half-reflective layer, i.e., it may be realized that half of the light rays irradiated to the transflective layer 1031 are transmitted and half of the light rays are reflected.

In summary, embodiments of the present application provide a display panel that includes a liquid crystal cell, a first polarizing assembly and a second polarizing assembly. The first polarizing assembly includes at least a first polarizing layer having a first transmission axis and is configured for generating polarized light with a polarization direction parallel to the first transmission axis. The second polarizing assembly includes at least a transflective layer and a light absorbing layer. The transflective layer has a second transmission axis and is configured for transmitting polarized light with polarization direction parallel to the second transmission axis and for reflecting polarized light with polarization direction perpendicular to the second transmission axis. The light absorbing layer is configured to absorb the polarized light transmitted by the transflective layer. The embodiments of the present application realize a reflective display panel by combining the first polarizing layer in the first polarizing assembly, and the transflective layer and the light absorbing layer in the second polarizing assembly, and thus the contrast of the display panel may be improved and the display panel may be prepared in batch at a lower cost.

In an embodiment of the present application, the first polarizing assembly 102 is closer to an incoming light side than the second polarizing assembly 103. Light at the incoming light side includes external ambient light, and/or, light emitted from the second light source assembly included in the display panel 10. The second light source assembly is located on the display side of the display panel 10, i.e., on the side of the first polarizing assembly 102 further away from the liquid crystal cell 101.

In a case that the external ambient light is sufficient, the light from the incoming light side may include only the external ambient light, and the second light source assembly may not need to emit light. In a case that the external ambient light is insufficient, the second light source assembly may emit light to realize a light supplement effect. In such a case, the light from the incoming light side may include the light emitted by the second light source assembly.

Optionally, the material of the first polarizing layer 1021 may be polyvinyl alcohol (PVA) plus iodide ions, and the first polarizing layer 1021 may be referred to as a first PVA layer. An advanced polarizer film (APF) mainly serves as a brightener in conventional liquid crystal display products, and the present application may utilize its reflective function to use it as the transflective layer 1031 in the embodiments of the present application. The transflective layer 1031 may be referred to as an APF layer.

Optionally, the first substrate 1011 and the second substrate 1012 may be a glass substrate or a quartz substrate, which is not limited in embodiments of the present application.

Figure 2:
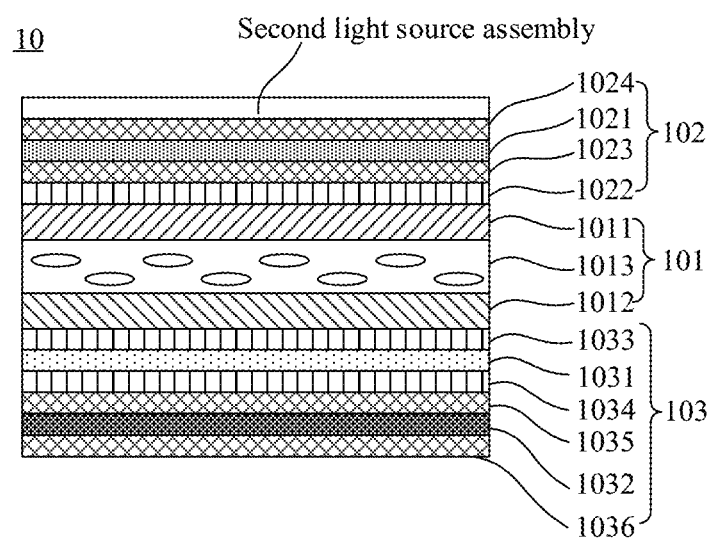
FIG. 2 is a structural schematic diagram of another display panel provided by an embodiment of the present application.
Figure 3:
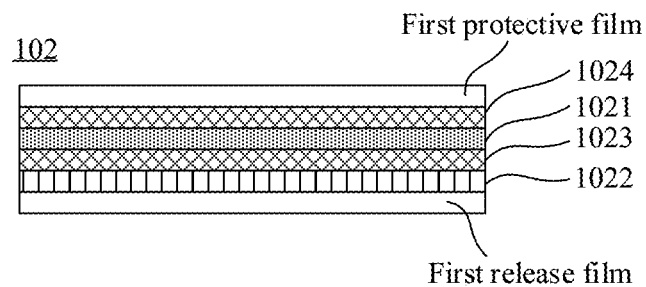
FIG. 3 is a structural schematic diagram of a first polarizing assembly provided by an embodiment of the present application.

FIG. 2 is a structural schematic diagram of another display panel provided by an embodiment of the present application. FIG. 3 is a structural schematic diagram of a first polarizing assembly provided by an embodiment of the present application. As can be seen in conjunction with FIGS. 2 and 3, the first polarizing assembly 102 may further include a first adhesive layer 1022, a first protective layer 1023 and a second protective layer 1024. The first adhesive layer 1022 may be disposed on a side of the first polarizing layer 1021 closer to the liquid crystal cell 101, and the first protective layer 1023 may be disposed between the first adhesive layer 1022 and the first polarizing layer 1021. The second protective layer 1024 may be disposed on a side of the first polarizing layer 1021 further away from the liquid crystal cell 101. That is, the first adhesive layer 1022, the first protective layer 1023, the first polarizing layer 1021, and the second protective layer 1024 in the first polarizing assembly 102 are sequentially laminated in a direction further away from the liquid crystal cell 101. The first adhesive layer 1022 may be configured to bond the first protective layer 1023 to the first substrate 1011, and the first protective layer 1023 and the second protective layer 1024 are configured to protect two surfaces of the first polarizing layer 1021, respectively.

In the embodiments of the present application, as a first optional implementation, the light absorbing layer 1032 may be a second polarizing layer. The second polarizing layer 1032 has an absorption axis and a third transmission axis. The absorption axis is parallel to the second transmission axis, and the third transmission axis is perpendicular to the second transmission axis. The second polarizing layer 1032 may be referred to as a second PVA layer.

Figure 4:
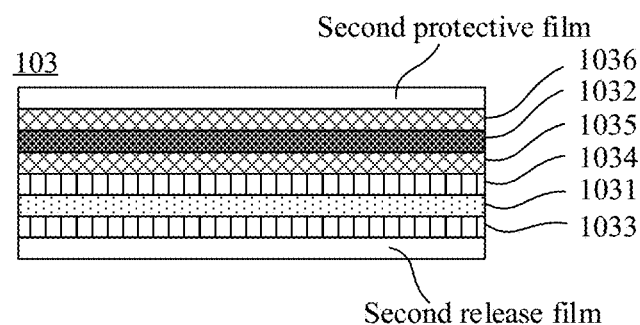
FIG. 4 is a structural schematic diagram of a second polarizing assembly provided by an embodiment of the present application.

FIG. 4 is a structural schematic diagram of a second polarizing assembly provided by an embodiment of the present application. In conjunction with FIGS. 2 and 4, the second polarizing assembly 103 may further include a second adhesive layer 1033, a third adhesive layer 1034, a third protective layer 1035 and a fourth protective layer 1036. The second adhesive layer 1033 is disposed on a side of the transflective layer 1031 closer to the liquid crystal cell 101. The third adhesive layer 1034 is disposed between the transflective layer 1031 and the second polarizing layer 1032. A third protective layer 1035 is disposed between the third adhesive layer 1034 and the second polarizing layer 1032. The fourth protective layer 1036 is disposed on a side of the second polarizing layer 1032 further away from the liquid crystal cell 101. That is, in a case that the light absorbing layer 1032 is the second polarizing layer 1032, the second adhesive layer 1033, the transflective layer 1031, the third adhesive layer 1034, the third protective layer 1035, the second polarizing layer 1032 and the fourth protective layer 1036 in the second polarizing assembly 103 are sequentially laminated in a direction further away from the liquid crystal cell 101. The second adhesive layer 1033 is configured to bond the transflective layer 1031 and the second substrate 1012, the third adhesive layer 1034 is configured to bond the transflective layer 1031 and the third protective layer 1035, and the third protective layer 1035 and the fourth protective layer 1036 are configured to protect two surfaces of the second polarizing layer 1032, respectively.

In embodiments of the present application, the material of each adhesive layer (the first adhesive layer 1022, the second adhesive layer 1033 and the third adhesive layer 1034) may include a pressure sensitive adhesive (PSA) whose primary function is to bond the two sides of the membrane layer. The material of each protective layer (the first protective layer 1023, the second protective layer 1024, the third protective layer 1035 and the fourth protective layer 1036) may include triacetyl cellulose (TAC) whose main function is to protect the surface of the polarizing layer.

Each protective layer can be treated in different ways, which include normal treatment (i.e. no special treatment) and special treatment. The special treatment includes hardcoat (HC) treatment and 0-bit phase delay treatment.

The hardcoat (HC) treatment is typically applied to a protective layer of a surface layer. For example, the second protective layer 1024 may be applied with the HC treatment, and the second protective layer 1024 may be referred to as an HC-TAC layer.

A protective layer subjected to the 0-bit phase delay treatment may have a better viewing angle, contrast and color bias. Thus the protective layer through which the optical path passes may be applied with the 0-bit phase difference delay treatment. For example, the first protective layer 1023 and the third protective layer 1035 may be applied with the 0-bit phase difference delay treatment, and the second protective layer 1024 and the third protective layer 1035 may be referred to as 0-TAC layers. Alternatively, the first protective layer 1023 and the third protective layer 1035 may be applied with the normal treatment, and the second protective layer 1024 and third protective layer 1035 may be referred to as TAC layers.

The normal treatment may be applied to a protective layer which the optical path does not pass through and only needs to play a role of protection. For example, the fourth protective layer 1036 may be applied with the normal treatment and the fourth protective layer 1036 may be referred to as a TAC layer. Alternatively, the fourth protective layer 1036 may also be applied with the 0-bit phase difference delay treatment, i.e., the fourth protective layer 1036 may also be referred to as a 0-TAC layer.

The first polarizing assembly 102 illustrated in FIG. 3 further includes a first protective film and a first release film, and their function is to protect film layers between them. The second polarizing assembly 103 illustrated in FIG. 4 further includes a second protective film and a second release film, and their function is to protect film layers between them. FIGS. 3 and 4 respectively illustrate the first polarizing assembly 102 and the second polarizing assembly 103 before being adhered to the liquid crystal cell 101.

In addition, when the first polarizing assembly 102 is adhered to the liquid crystal cell 101, the first release film is removed first to enable the first adhesive layer 1022 to be bonded to the first substrate 1011 of the liquid crystal cell 101. When the second polarizing assembly 103 is adhered to the liquid crystal cell 101, the second release film is removed first to enable the second adhesive layer 1033 to be bonded to the second substrate 1012 of the liquid crystal cell 101. The first protective film and the second protective film are removed when the display panel is later assembled into a display module. That is, the first protective film, the first release film, the second protective film and the second release film are not included in the final produced product, which is the main reason why the first protective film, the first release film, the second protective film and the second release film are not shown in the display panel 10 illustrated in FIG. 2.

It should be noted that in the related art, an APF layer of a second polarizing assembly included in a reflective LCD display panel is further away from the liquid crystal cell than a second PVA layer. Light for the liquid crystal display panel typically comes from a backlight source assembly on a side of the APF layer further away from the liquid crystal cell. The light emitted from the backlight source assembly needs to pass through the APF layer first, and the light passing through the APF layer enters the second PVA layer, the light passing through the second PVA layer passes through the liquid crystal cell, and the light passing through the liquid crystal cell passes through the first PVA layer of the first polarizing assembly. That is, in the related art, the light that can be emitted must be the light that can be transmitted through the second PVA layer and the APF layer.

In an embodiment of the present application, the light is mainly the light that comes from ambient light at the display side of the display panel or the light that is emitted from the second light source assembly located on the display side of the display panel. The APF layer of the second polarizing assembly is closer to the liquid crystal cell than the second PVA layer. The light first passes through the first PVA layer of the first polarizing assembly 102 and the liquid crystal cell 101, and then reaches the APF layer of the second polarizing assembly 103. The APF layer reflects the polarized light whose polarization direction is perpendicular to the second transmission axis, and the reflected polarized light passes through the liquid crystal cell 101 and the first PVA layer of the first polarizing assembly 102 again. That is, the emitted light must be the light reflected by the APF. The lamination relationship between the APF layer and the second PVA layer of the second polarizing assembly 103 in the embodiment of the present application as well as the design of the optical path are both different from those of the related art.

For the convenience of understanding the difference between the embodiments of the present application and the related art, the relevant descriptions in the related art refer to the relevant descriptions in the embodiments of the present application, e.g., the descriptions such as the first polarizing assembly, the first PVA layer, the second polarizing assembly, the APF layer and the second PVA layer are also used in the related art. In fact, these components or film layers may not be included in the related art.

In embodiments of the present application, the liquid crystal cell 101 may be a twisted nematic (TN) liquid crystal cell, an in-plane switching (IPS) liquid crystal cell, or a multi-quadrant vertical alignment (VA) liquid crystal cell. In addition, advanced super dimension switch (ADS) technology can also be used with plane switching liquid crystal cell, and the difference between ADS and IPS lies in different electrode designs. The following descriptions for the IPS liquid crystal cell also apply to the ADS cell.

For the TN liquid crystal cell 101, an orientation of the liquid crystal molecules of the liquid crystal layer 1013 closer to the first substrate 1011 is perpendicular to an orientation of the liquid crystal molecules of the liquid crystal layer 1013 closer to the second substrate 1012. In a case of not being powered up, the polarization direction of the polarized light is deflected by 90° (degrees) after it passes through the liquid crystal cell 101. For the IPS liquid crystal cell 101, an orientation of the liquid crystal molecules of the liquid crystal layer 1013 closer to the first substrate 1011 is parallel to an orientation of the liquid crystal molecules of the liquid crystal layer 1013 closer to the second substrate 1012. In a case of not being powered up, the polarization direction of the polarized light remains unchanged after it passes through the liquid crystal cell 101. For the VA liquid crystal cell 101, an orientation of the liquid crystal molecules of the liquid crystal layer 1013 closer to the first substrate 1011 is parallel to an orientation of the liquid crystal molecules of the liquid crystal layer 1013 closer to the second substrate 1012. In a case of not being powered up, the polarization direction of the polarized light remains unchanged after it passes through the liquid crystal cell 101.

In the first case, the display panel shown in FIG. 2 is taken as an example. If the liquid crystal cell 101 is the TN liquid crystal cell and the display panel is in a total reflection constantly white mode, an orientation of the liquid crystal molecules as well as the transmission axis are designed as follows. The first transmission axis of the first polarizing layer 1021 is parallel to the orientation of the liquid crystal molecules of the TN liquid crystal cell 101 closer to the first substrate 1011, the second transmission axis of the transflective layer 1031 is perpendicular to the orientation of the liquid crystal molecules of the TN liquid crystal cell 101 closer to the second substrate 1012, and the absorption axis of the second polarizing layer 1032 is parallel to the second transmission axis of the transflective layer 1031 (the third transmission axis of the second polarizing layer 1032 is perpendicular to the second transmission axis of the transflective layer 1031). The total reflection constantly white mode means that: without power, the light can be emitted and is in a bright state; and with power, the light cannot be emitted and is in a dark state.

Figure 5:
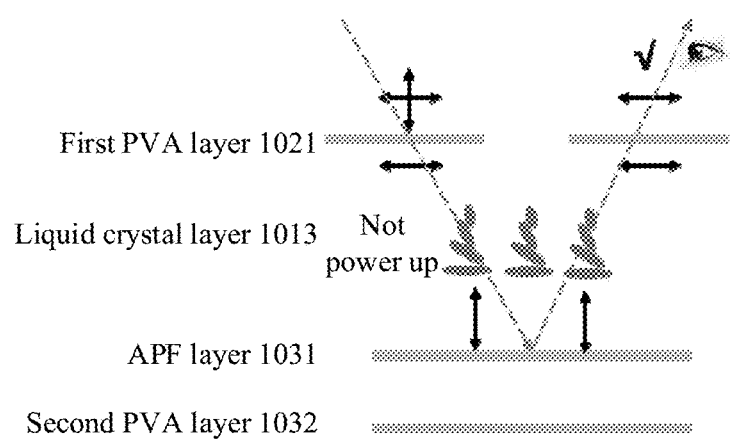
FIG. 5 is an optical path diagram of a constantly white mode display panel of a TN liquid crystal cell provided by an embodiment of the present application when not powered up.

Referring to FIG. 5, in a case that the liquid crystal layer 1013 is not powered up, after light (external ambient light or light emitted from the second light source assembly located on the display side of the display panel) is incident to the first polarizing layer 1021 of the first polarizing assembly 102, firstly polarized light (linearly polarized light) with a polarization direction parallel to the first transmission axis is generated. After passing through the TN liquid crystal cell 101, the polarization direction of the first polarized light is rotated by 90° and obtain a second polarized light (linearly polarized light). The polarization direction of the second polarized light is perpendicular to the second transmission axis of the transflective layer 1031, and the second polarized light is reflected by the transflective layer 1031 to the TN liquid crystal cell 101. After passing through the TN liquid crystal cell 101, the polarization direction of the second polarized light is rotated by 90° and obtain a third polarized light (linearly polarized light). The polarization direction of the third polarized light is parallel to the polarization direction of the first polarized light, i.e., the polarization direction of the third polarized light is parallel to the first transmission axis of the first polarizing layer 1021. The third polarized light may be emitted through the first polarizing assembly 102 and achieve a constantly white mode, i.e., a bright state.

Figure 6:
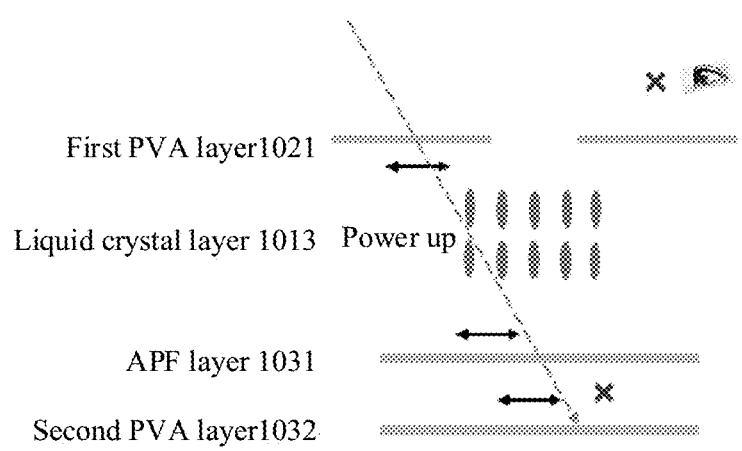
FIG. 6 is an optical path diagram of a constantly white mode display panel of a TN liquid crystal cell provided by an embodiment of the present application when powered up.

Referring to FIG. 6, in the case that the liquid crystal layer 1013 is powered up, after the light (external ambient light or light from the second light source assembly disposed on the display side of the display panel) is incident on the first polarizing layer 1021 of the first polarizing assembly 102, the first polarized light (linearly polarized light) with a polarization direction parallel to the first transmission axis is generated. The polarization direction of the first polarized light remains unchanged after the first polarized light passes through the TN liquid crystal cell 101, i.e., it is still the first polarized light. Since the polarization direction of the first polarized light is parallel to the second transmission axis of the transflective layer 1031, the first polarized light can be irradiated through the transflective layer 1031 to the second polarized layer 1032. The absorption axis of the second polarized layer 1032 is parallel to the second transmission axis of the transflective layer 1031, so that the first polarized light transmitted through the transflective layer 1031 can be absorbed by the second polarized layer 1032, no light comes out and the light cannot return to enter the human eye, thereby realizing a black state, i.e., a dark state.

In the first case, it is actually only necessary to ensure that the first transmission axis of the first polarizing layer 1021 is parallel to the second transmission axis of the transflective layer 1031 to realize the above mentioned constantly white mode of the TN liquid crystal cell 101. The initial orientation of the substrate and the liquid crystal molecules in the TN liquid crystal cell 101 can be at an arbitrary angle.

In the second case, taking the display panel shown in FIG. 2 as an example, if the liquid crystal cell 101 is a TN liquid crystal cell and the display panel is in the total reflection constantly black mode, the orientation of the liquid crystal molecules and the light transmittance axes are designed as follows. The first transmission axis of the first polarizing layer 1021 is parallel to the orientation direction of the liquid crystal molecules of the TN liquid crystal cell 101 closer to the first substrate 1011, the second transmission axis of the transflective layer 1031 is parallel to the orientation direction of the liquid crystal molecules of the TN liquid crystal cell 101 closer to the second substrate 1012, and the absorption axis of the second polarizing layer 1032 is parallel to the second transmission axis of the transflective layer 1031 (the third transmission axis of the second polarizing layer 1032 is perpendicular to the second transmission axis of the transflective layer 1031). The total reflection constantly black mode means: without power, the light cannot come out and is in a dark state; with power, the light can come out and is in a bright state.

Figure 7:
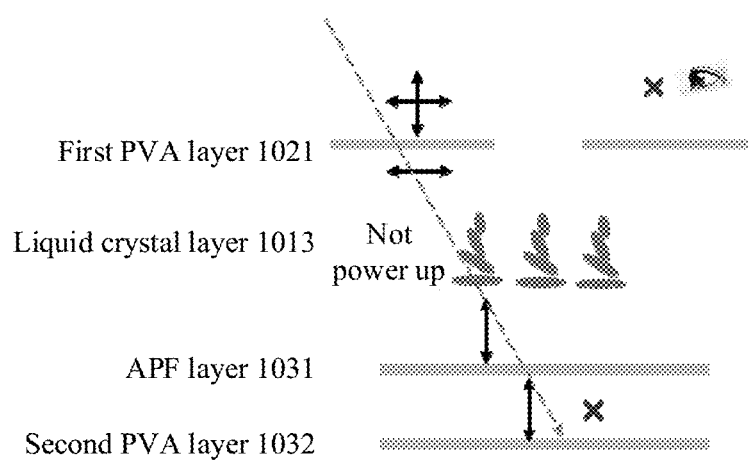
FIG. 7 is an optical path diagram of a constantly black mode display panel of a TN liquid crystal cell provided by an embodiment of the present application when not powered up.

Referring to FIG. 7, in the case that the liquid crystal layer 1013 is not powered up, after the light (external ambient light or light emitted from the second light source assembly located on the display side of the display panel) is incident to the first polarizing layer 1021 of the first polarizing assembly 102, the first polarized light (linearly polarized light) with a polarization direction parallel to a first transmission axis is generated. The first polarized light is rotated by 90° in the polarization direction after passing through the TN liquid crystal cell 101 to obtain the second polarized light (linearly polarized light). The polarization direction of the second polarized light is parallel to the second transmission axis of the transflective layer 1031, so that the second polarized light can be irradiated through the transflective layer 1031 to the second polarizing layer 1032. The absorption axis of the second polarizing layer 1032 is parallel to the second transmission axis of the transflective layer 1031, so that the second polarized light transmitted through the transflective layer 1031 can be absorbed by the second polarizing layer 1032, no light comes out and the light cannot return to the human eye, thereby realizing a black state, i.e., a dark state.

Figure 8:
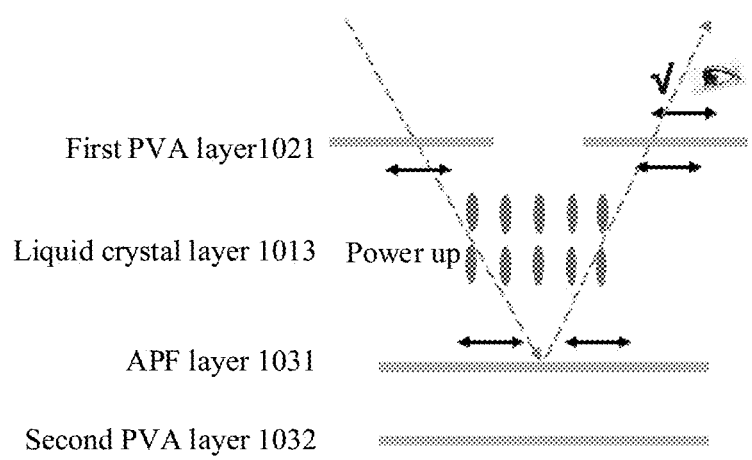
FIG. 8 is an optical path diagram of a constantly black mode display panel of a TN liquid crystal cell provided by an embodiment of the present application when powered up.

Referring to FIG. 8, in the case that the liquid crystal layer 1013 is powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to a first transmission axis is generated. The polarization direction of the first polarized light remains unchanged after the first polarized light passes through the TN liquid crystal cell 101, i.e., it is still the first polarized light. Since the polarization direction of the first polarized light is perpendicular to the second transmission axis of the transflective layer 1031, the first polarized light is reflected by the transflective layer 1031 back to the TN liquid crystal cell 101. The direction of the first polarized light remains unchanged, i.e., it is parallel to the first transmission axis of the first polarizing layer 1021 after passing through the TN liquid crystal cell 101. The first polarized light is able to exit through the first polarizing assembly 102, thereby achieving a white state, i.e., a bright state.

In the second case, it is actually only necessary to ensure that the first transmission axis of the first polarizing layer 1021 is perpendicular to the second transmission axis of the transflective layer 1031 to achieve the above mentioned constantly black state mode of the TN liquid crystal cell 101. The initial orientation of the substrate and the liquid crystal molecules in the TN liquid crystal cell 101 can be at any angle.

For the TN liquid crystal cell 101, the constantly black mode for the second case can be obtained by rotating both the transflective layer 1031 and the second polarizing layer 1032 in the constantly white mode for the first case by 90°.

In the third case, taking the display panel shown in FIG. 2 as an example, if the liquid crystal cell 101 is an IPS-type liquid crystal cell 101 and the display panel is in the total reflection constantly white mode, the orientation of the liquid crystal molecules and the transmission axis are designed as follows. The first transmission axis of the first polarizing layer 1021 is parallel to the orientation direction of the liquid crystal molecules of the IPS liquid crystal cell 101 closer to the first substrate 1011, the second transmission axis of the transflective layer 1031 is perpendicular to the orientation direction of the liquid crystal molecules of the IPS liquid crystal cell 101 closer to the second substrate 1012, and the absorption axis of the second polarizing layer 1032 is parallel to the second transmission axis of the transflective layer 1031 (the third transmission axis of the second polarizing layer 1032 is perpendicular to the second transmission axis of the transflective layer 1031).

Figure 9:
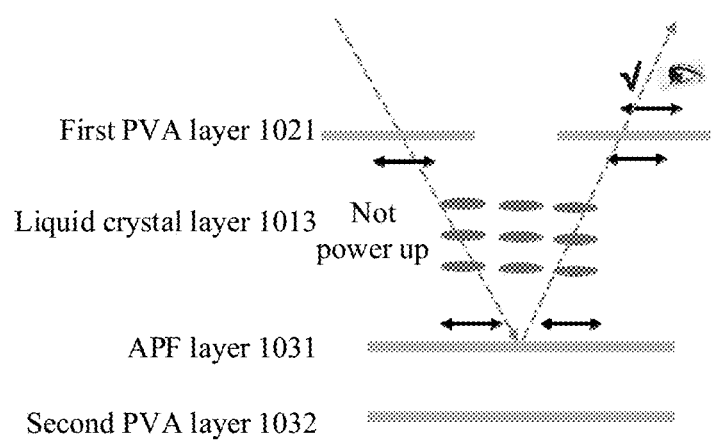
FIG. 9 is an optical path diagram of a constantly white mode display panel of an IPS liquid crystal cell provided by an embodiment of the present application when not powered up.

Referring to FIG. 9, in the case that the liquid crystal layer 1013 is not powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to a first transmission axis is generated. The first polarized light is changed to the second polarized light after passing through the IPS liquid crystal cell 101 (since the liquid crystal cell does not function when not being powered up, the second polarized light and the first polarized light have the same polarization direction). The polarization direction of the second polarized light is perpendicular to the second transmission axis of the transflective layer 1031, and thus the second polarized light is reflected by the transflective layer 1031 back to the IPS liquid crystal cell 101, and the polarization direction of the second polarized light remains unchanged after passing through the IPS liquid crystal cell 101, i.e., it is parallel to the first transmission axis of the first polarizing layer 1021. The second polarized light is able to exit through the first polarizing assembly 102, thereby achieving a constantly white mode, i.e., a bright state.

Figure 10:
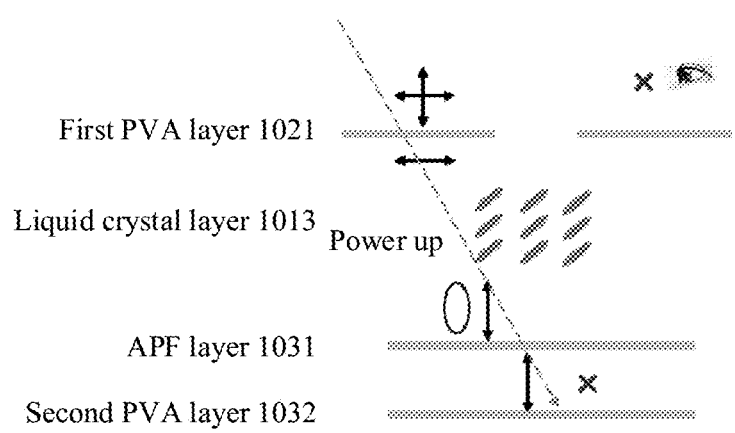
FIG. 10 is an optical path diagram of a constantly white mode display panel of an IPS liquid crystal cell provided by an embodiment of the present application when powered up.

Referring to FIG. 10, in the case that the liquid crystal layer 1013 is powered up, after light (external ambient light or light emitted from the second light source assembly located on the display side of the display panel) is incident to the first polarizing layer 1021 of the first polarizing assembly 102, the first polarized light (linearly polarized light) with a polarization direction parallel to the first transmission axis is generated. The first polarized light changes into a second polarized light (elliptically polarized light) after passing through the IPS liquid crystal cell 101, and the polarization direction of the effectively polarized light (elliptically polarized light can be decomposed into polarized components of two linearly polarized light perpendicular to each other, linearly polarized light of the larger component is defined as the effectively polarized light and a polarization direction of the linearly polarized light of the larger component is a polarization direction of the effectively polarized light) of the second polarized light is parallel to the second transmission axis of the transflective layer 1031. Therefore, the effectively polarized light of the second polarized light can be irradiated through the transflective layer 1031 to the second polarizing layer 1032. The absorption axis of the second polarizing layer 1032 is parallel to the second transmission axis of the transflective layer 1031, so that the effectively polarized light of the second polarized light transmitted through the transflective layer 1031 can be absorbed by the second polarizing layer 1032, no light comes out, and the light cannot return to enter the human eye, thereby realizing a black state, i.e., a dark state.

In the third case, it is actually only necessary to ensure that the first transmission axis of the first polarizing layer 1021 is perpendicular to the second transmission axis of the transflective layer 1031 to realize the constantly white mode of the above-described IPS liquid crystal cell 101. The initial orientation of the substrate and the liquid crystal molecules in the IPS liquid crystal cell 101 can be at an arbitrary angle.

In the fourth case, taking the display panel shown in FIG. 2 as an example, if the liquid crystal cell 101 is an IPS liquid crystal cell 101 and the display panel is in the total reflection constantly black mode, the orientation of the liquid crystal molecules and the light transmittance axes are designed as follows. The first transmission axis of the first polarizing layer 1021 is parallel to the orientation direction of the liquid crystal molecules of the IPS liquid crystal cell 101 closer to the first substrate 1011, the second transmission axis of the transflective layer 1031 is parallel to the orientation of the liquid crystal molecules of the IPS liquid crystal cell 101 closer to the second substrate 1012, and the absorption axis of the second polarizing layer 1032 is parallel to the second transmission axis of the transflective layer 1031 (the third transmission axis of the second polarizing layer 1032 is perpendicular to the second transmission axis of the transflective layer 1031).

Figure 11:
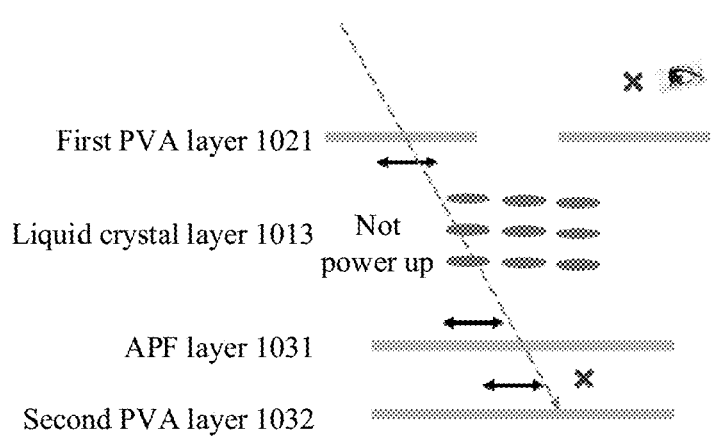
FIG. 11 is an optical path diagram of a constantly black mode display panel of an IPS liquid crystal cell provided by an embodiment of the present application when not powered up.

Referring to FIG. 11, in the case that the liquid crystal layer 1013 is not powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to the first transmission axis is generated. The first polarized light is changed to the second polarized light after passing through the IPS liquid crystal cell 101 (since the liquid crystal cell does not function when not being powered up, the second polarized light and the first polarized light have the same polarization direction). The polarization direction of the second polarized light is parallel to the second transmission axis of the transflective layer 1031, so that the second polarized light can be irradiated through the transflective layer 1031 to the second polarizing layer 1032. The absorption axis of the second polarizing layer 1032 is parallel to the second transmission axis of the transflective layer 1031, so that the second polarized light transmitted through the transflective layer 1031 can be absorbed by the second polarizing layer 1032, no light comes out, and the light cannot return to the human eye, thereby realizing a constantly black mode, i.e., a dark state.

Figure 12:
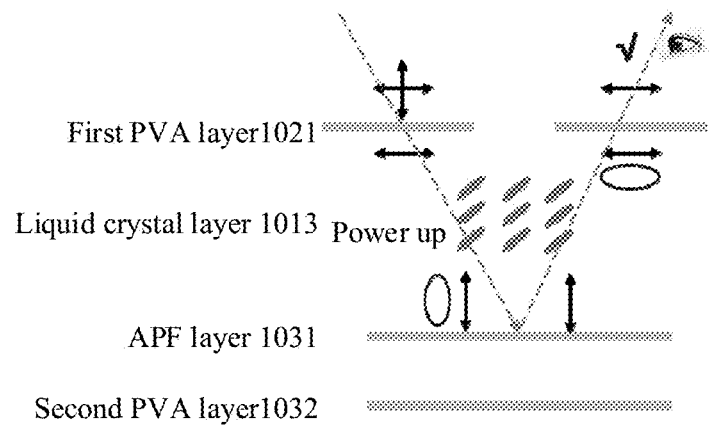
FIG. 12 is an optical path diagram of a constantly black mode display panel of an IPS liquid crystal cell provided by an embodiment of the present application when powered up.

Referring to FIG. 12, in the case that the liquid crystal layer 1013 is powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to a first transmission axis is generated. The first polarized light is changed into a second polarized light (elliptically polarized light) after passing through the IPS liquid crystal cell 101. The polarization direction of the effectively polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is perpendicular to the second transmission axis of the transflective layer 1031. Therefore, the effectively polarized light of the second polarized light is reflected back to the IPS liquid crystal cell 101 by the transflective layer 1031. The polarization direction of the effectively polarized light of the second polarized light remains unchanged after passing through the IPS liquid crystal cell 101, i.e., it is parallel to the first transmission axis of the first polarizing layer 1021. The effectively polarized light of the second polarized light is able to exit through the first polarizing assembly 102, thereby realizing a white state, i.e., a bright state.

In the fourth case, it is actually only necessary to ensure that the first transmission axis of the first polarizing layer 1021 is parallel to the second transmission axis of the transflective layer 1031 to realize the above mentioned constantly black mode of the IPS liquid crystal cell 101. The initial orientation of the substrate and the liquid crystal molecules in the IPS liquid crystal cell 101 can be at any angle.

For the IPS liquid crystal cell 101, the constantly black mode for the fourth case may be obtained by rotating both the transflective layer 1031 and the second polarizing layer 1032 in the constantly white mode for the third case by 90°.

In the fifth case, taking the display panel shown in FIG. 2 as an example, if the liquid crystal cell 101 is a VA liquid crystal cell 101 and the display panel is in the total reflection constantly white mode, the orientation of the liquid crystal molecules as well as the design of the transmittance axes are as follows. The first transmission axis of the first polarizing layer 1021 is perpendicular to the second transmission axis of the transflective layer 1031, and the absorption axis of the second polarizing layer 1032 is parallel to the second transmission axis of the transflective layer 1031 (the third transmission axis of the second polarizing layer 1032 is perpendicular to the second transmission axis of the transflective layer 1031). The VA liquid crystal cell 101 follows any orientation pattern of the VA.

Figure 13:
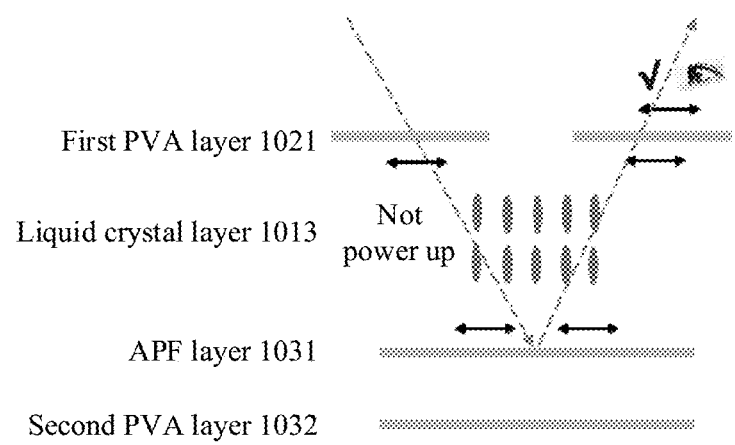
FIG. 13 is an optical path diagram of a constantly white mode display panel of a VA liquid crystal cell provided by an embodiment of the present application when not powered up.

Referring to FIG. 13, in the case that the liquid crystal layer 1013 is not powered up, after the light (external ambient light or light emitted from the second light source assembly located on the display side of the display panel) is incident on the first polarizing layer 1021 of the first polarizing assembly 102, the first polarized light (linearly polarized light) with the polarization direction parallel to the first transmission axis is generated. The first polarized light changes to the second polarized light after passing through the VA liquid crystal cell 101 (since the liquid crystal cell does not function when not being powered up, the second polarized light and the first polarized light have the same polarization direction). The polarization direction of the second polarized light is perpendicular to the second transmission axis of the transflective layer 1031, so the second polarized light is reflected by the transflective layer 1031 back to the VA liquid crystal cell 101. The polarization direction of the second polarized light remains unchanged after passing through the VA liquid crystal cell 101, i.e., it is parallel to the first transmission axis of the first polarizing layer 1021. The second polarized light is able to be emitted through the first polarizing assembly 102 to achieve a constantly white mode, i.e., a bright state.

Figure 14:
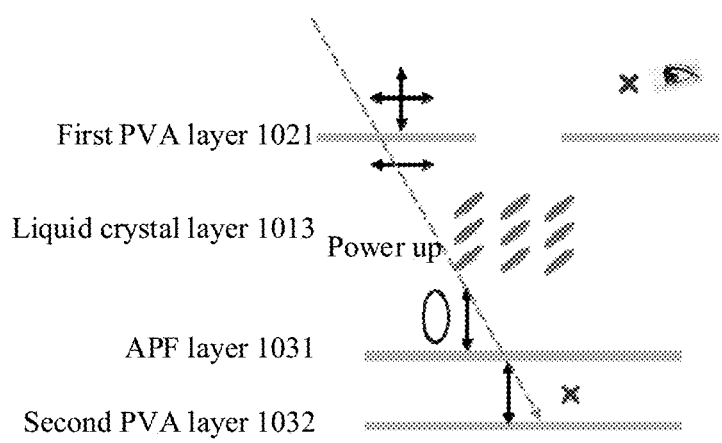
FIG. 14 is an optical path diagram of a constantly white mode display panel of a VA liquid crystal cell provided by an embodiment of the present application when powered up.

Referring to FIG. 14, in the case that the liquid crystal layer 1013 is powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to a first transmission axis is generated. The first polarized light changes to the second polarized light (elliptically polarized light) after passing through the VA liquid crystal cell 101. The polarization direction of the effectively polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is parallel to the second transmission axis of the transflective layer 1031. Therefore, the effectively polarized light of the second polarized light can be irradiated to the second polarized light layer 1032 through the transflective layer 1031. The absorption axis of the second polarizing layer 1032 is parallel to the second transmission axis of the transflective layer 1031, so that the effectively polarized light of the second polarized light transmitted from the transflective layer 1031 can be absorbed by the second polarizing layer 1032, no light comes out, and the light cannot return to the human eye, thereby realizing the black state, i.e., the dark state.

In the sixth case, taking the display panel shown in FIG. 2 as an example, if the liquid crystal cell 101 is the VA liquid crystal cell 101 and the display panel is in the total reflection constantly black mode, the orientation of the liquid crystal molecules as well as the design of the transmittance axes are as follows. The first transmission axis of the first polarizing layer 1021 is parallel to the second transmission axis of the transflective layer 1031, and the absorption axis of the second polarizing layer 1032 is parallel to the second transmission axis of the transflective layer 1031 (the third transmission axis of the second polarizing layer 1032 is perpendicular to the second transmission axis of the transflective layer 1031). The VA liquid crystal cell 101 follows any orientation pattern of the VA is possible.

Figure 15:
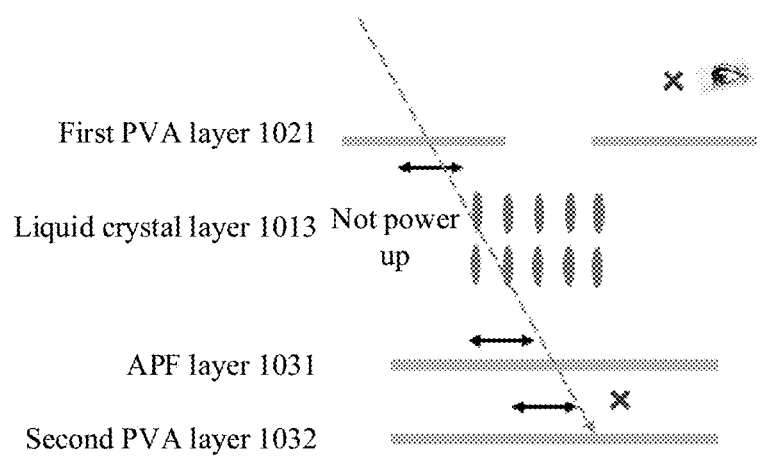
FIG. 15 is an optical path diagram of a constantly black mode display panel of a VA liquid crystal cell provided by an embodiment of the present application when not powered up.

Referring to FIG. 15, in the case that the liquid crystal layer 1013 is not powered up, after the light (external ambient light or light emitted from the second light source assembly located on the display side of the display panel) is incident on the first polarizing layer 1021 of the first polarizing assembly 102, the first polarized light (linearly polarized light) with a polarization direction parallel to the first transmission axis is generated. The first polarized light is changed to the second polarized light after passing through the VA liquid crystal cell 101 (since the liquid crystal cell does not function when not being powered up, the second polarized light and the first polarized light have the same polarization direction). The polarization direction of the second polarized light is parallel to the second transmission axis of the transflective layer 1031, so that the second polarized light can be irradiated through the transflective layer 1031 to the second polarizing layer 1032. The absorption axis of the second polarizing layer 1032 is parallel to the second transmission axis of the transflective layer 1031, so that the second polarized light transmitted through the transflective layer 1031 can be absorbed by the second polarizing layer 1032, no light comes out and the light cannot return to the human eye, thereby realizing a constant dark mode, i.e., a dark state.

Figure 16:
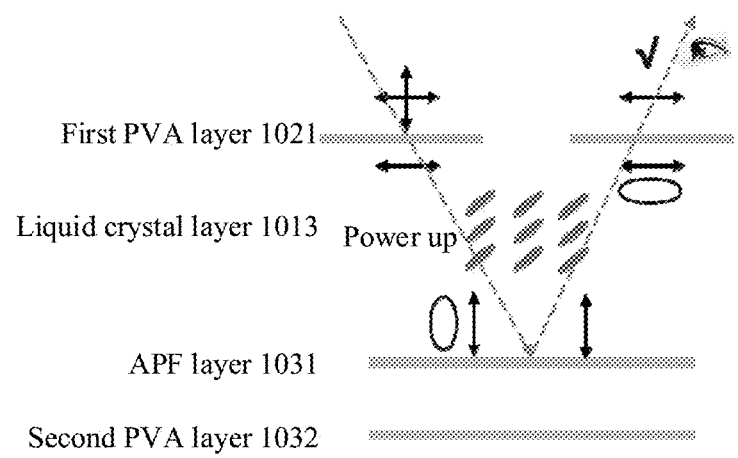
FIG. 16 is an optical path diagram of a constantly black mode display panel of a VA liquid crystal cell provided by an embodiment of the present application when powered up.

Referring to FIG. 16, in the case that the liquid crystal layer 1013 is powered up, the light (external ambient light or light emitted from the second light source assembly located on the display side of the display panel) is incident on the first polarizing layer 1021 of the first polarizing assembly 102, the first polarized light (linearly polarized light) with a polarization direction parallel to the first transmission axis is generated. The first polarized light changes to the second polarized light (elliptically polarized light) after passing through the VA liquid crystal cell 101. The polarization direction of the effectively polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is perpendicular to the second transmission axis of the transflective layer 1031. Therefore, the effectively polarized light of the second polarized light is reflected back to the VA liquid crystal cell 101 by the transflective layer 1031. The polarization direction of the effectively polarized light of the second polarized light remains unchanged after passing through the IPS liquid crystal cell 101, i.e., it is parallel to the first transmission axis of the first polarizing layer 1021. The effectively polarized light of the second polarized light is able to exit through the first polarizing assembly 102, thereby achieving a white state, i.e., a bright state.

It is to be noted that, as can be seen in combination with the above cases, after passing through the first polarizing layer 1021 the linearly polarized light can be transformed into elliptically polarized light if it passes through the liquid crystal layer of the powered up IPS liquid crystal cell or passes through the liquid crystal layer of the powered up VA liquid crystal cell. The elliptically polarized light can be decomposed into polarized components of two linearly polarized light perpendicular to each other, the linearly polarized light of the larger component is defined as the effectively polarized light and the polarization direction of the linearly polarized light of the larger component is the polarization direction of the effectively polarized light. In addition, if it passes through the liquid crystal layer of the IPS liquid crystal cell which is not powered up or passes through the liquid crystal layer of the VA liquid crystal cell which is not powered up, the polarization direction of the linearly polarized light remains unchanged.

In embodiments of the present application, the display panel 10 may realize a constantly white mode or a constantly black mode. Different modes can thus be selected based on specific application scenarios of the display panel 10. Optionally, products such as cell phones, watches, and televisions can be used in the constantly black mode. Products such as law enforcement devices, sports code meters, price tags, and word cards can be used in the constantly white mode.

In embodiments of the present application, if the display side of the display panel 10 is not provided with the second light source assembly, the reliability of the display of the reflective display panel is relatively low if the display of the reflective display panel is satisfied solely by ambient light. For example, it is difficult to fulfill a reflective display by ambient light when the ambient light is insufficient (darker). As a result, the display panel may include a first light source assembly located on the side of the second polarizing assembly 103 further away from the liquid crystal cell 101, the first light source assembly may emit light, and the light emitted by the first light source assembly may be used to realize a supplemental light effect when the ambient light is insufficient. Of course, the display panel may also include both the first light source assembly and the second light source assembly.

Since the third transmission axis of the second polarizing layer 1032 is perpendicular to the second transmission axis of the transflective layer 1031, the light emitted from the first light source assembly (which is located on the side of the second polarizing assembly 103 further away from the liquid crystal cell 101) first passes through the second polarizing layer 1032 and then is transformed into polarized light with a polarization direction parallel to the third transmission axis. The polarized light cannot be transmitted through the second transmission axis of the second transflective layer 1031. In this case, the light emitted from the first light source assembly cannot be utilized. Accordingly, in order to enable the light emitted from the first light source assembly to be irradiated to the liquid crystal cell 101 and utilized, it is necessary to set a plurality of openings in one of the second polarizing layer 1032 and the transflective layer 1031. The openings may be configured to allow light from the first light source assembly to pass through.

Figure 17:
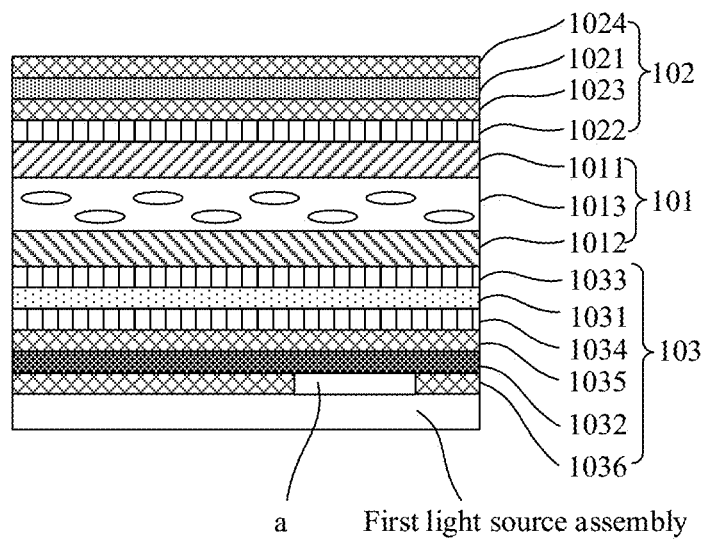
FIG. 17 is a structural schematic diagram of display panel in which an opening is designed in a second polarizing layer provided by an embodiment of the present application.

In a first manner, referring to FIG. 17, the second polarizing layer 1032 has a plurality of openings a (only one opening is illustrated in the figure). The plurality of openings a in the second polarizing layer 1032 are configured for the transmission of light emitted from the first light source assembly, and the transflective layer 1031 is configured to generate the polarized light parallel to the second transmission axis based on the light transmitted through the plurality of openings.

Taking a constantly white reflection mode of the TN liquid crystal cell 101 as an example, the light path is described as follows.

Figure 18:
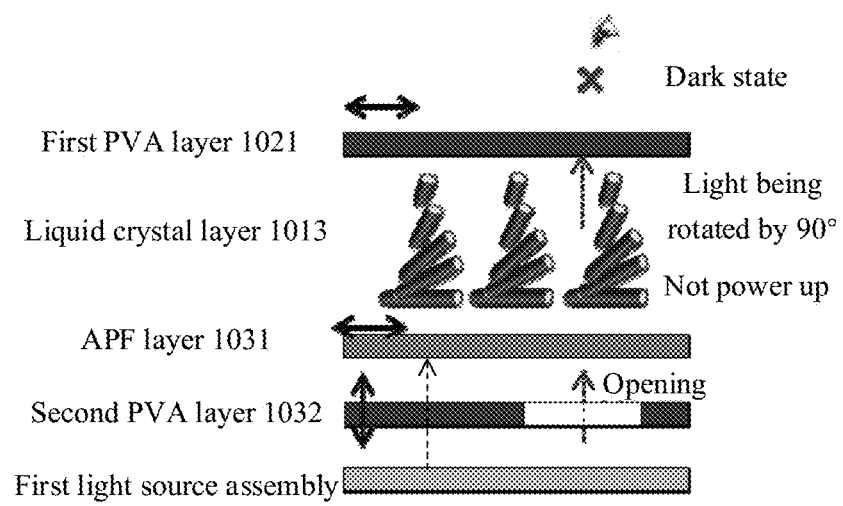
FIG. 18 is an optical path diagram provided by an embodiment of the present application in a case that an opening is designed in a second polarizing layer and a constantly white mode display panel of a TN liquid crystal cell is not powered up.
Figure 19:
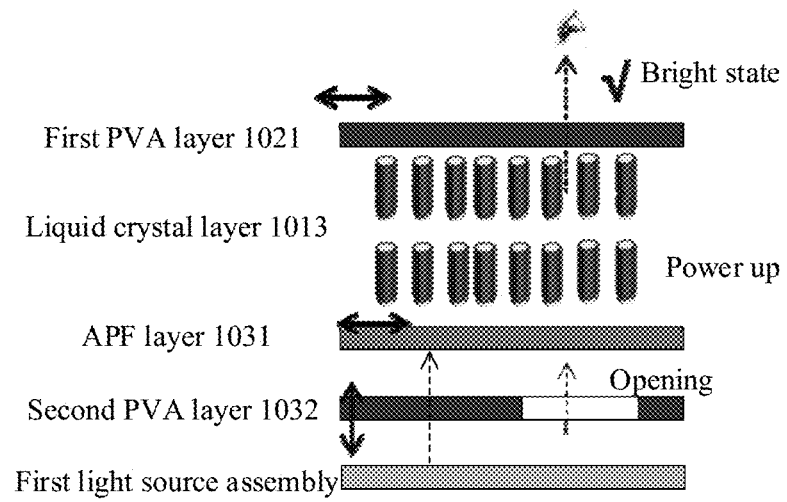
FIG. 19 is an optical path diagram provided by an embodiment of the present application in a case that an opening is designed in a second polarizing layer and a constantly white mode display panel of a TN liquid crystal cell is powered up.

Referring to FIGS. 18 and 19, for a position of the second polarizing layer 1032 with no openings, regardless of whether the liquid crystal layer 1013 is powered up or not, the light emitted from the first light source assembly located on the side of the second polarizing assembly 103 that is further away from the liquid crystal cell 101 passes through the second polarizing layer 1032 and generates polarized light with a polarization direction parallel to the third transmission axis. The first polarized light is irradiated to the transflective layer 1031, and since the second transmission axis of the transflective layer 1031 is perpendicular to the third transmission axis, the polarized light cannot pass through the transflective layer 1031.

Referring to FIG. 18, for the position of the opening of the second polarizing layer 1032, in the case that the liquid crystal layer 1013 is not powered up, the light emitted from the first light source assembly located on the side of the second polarizing assembly 103 further away from the liquid crystal cell 101 is irradiated through the opening of the second polarizing layer 1032 to the transflective layer 1031. Based on the light transmitted through the opening of the second polarizing layer 1032, the transflective layer 1031 generates polarized light (assumed to be refers to as a first polarized light, which is linearly polarized light) parallel to the second transmission axis. After the first polarized light passes through the TN liquid crystal cell 101, the polarization direction is rotated by 90° and a second polarized light (linearly polarized light) is obtained. A polarization direction of the second polarized light is perpendicular to the first transmission axis of the first polarizing layer 1021, no light is emitted, and thus the light cannot enter the human eye and is in a dark state.

Referring to FIG. 19, for the position of the opening of the second polarizing layer 1032, in the case that the liquid crystal layer 1013 is powered up, the light emitted from the first light source assembly located on the side of the second polarizing assembly 103 further away from the liquid crystal cell 101 is irradiated through the opening of the second polarizing layer 1032 to the transflective layer 1031. The transflective layer 1031 generates polarized light (assumed to be refers to as a first polarized light, which is linearly polarized light) parallel to the second transmission axis based on the light transmitted through the opening of the second polarizing layer 1032. The polarization direction of the first polarized light remains unchanged after the first polarized light passes through the TN liquid crystal cell 101, which is still the first polarized light. The polarization direction of the first polarized light is parallel to the first transmission axis of the first polarization layer 1021, the light can be emitted, and it is in a bright state.

It is to be noted that a TN constantly white reflection mode may refer to that the light emitted from the external ambient light can exit through the position with no openings. In this case, the display panel is in the TN constantly white reflection mode. Moreover, the light emitted from the first light source assembly located on the side of the second polarizing assembly 103 further away from the liquid crystal cell 101 cannot exit through the opening a provided in the second polarizing layer 1032 (the transmission is in the constantly black mode). Where, the TN constantly white reflection mode as well as the transmission constantly black mode cannot be used at the same time.

In addition, if the TN liquid crystal cell is in a TN constantly black reflection mode (the light emitted by the external ambient light cannot exit through the position with no openings), the display panel is in the TN constantly black reflection mode. Moreover, the light emitted from the first light source assembly located on the side of the second polarizing assembly 103 further away from the liquid crystal cell 101 can exit through the opening a provided in the second polarizing layer 1032 (the transmission is in the constantly white mode). Where, the TN constantly black reflection mode and the transmission constantly white mode cannot be used simultaneously.

Taking a constantly black reflection mode of the IPS liquid crystal cell 101 as an example, the light path is described as follows.

Figure 20:
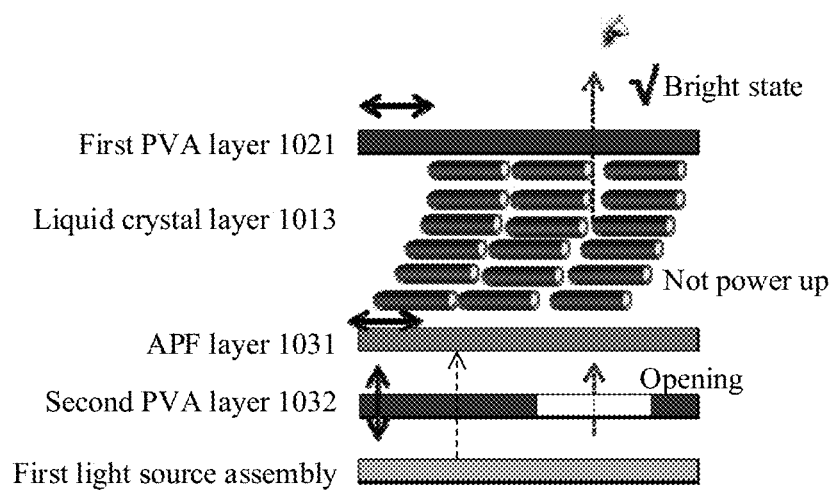
FIG. 20 is an optical path diagram provided by an embodiment of the present application in a case that an opening is designed in a second polarizing layer and a constantly black mode display panel of an IPS liquid crystal cell is not powered up.
Figure 21:
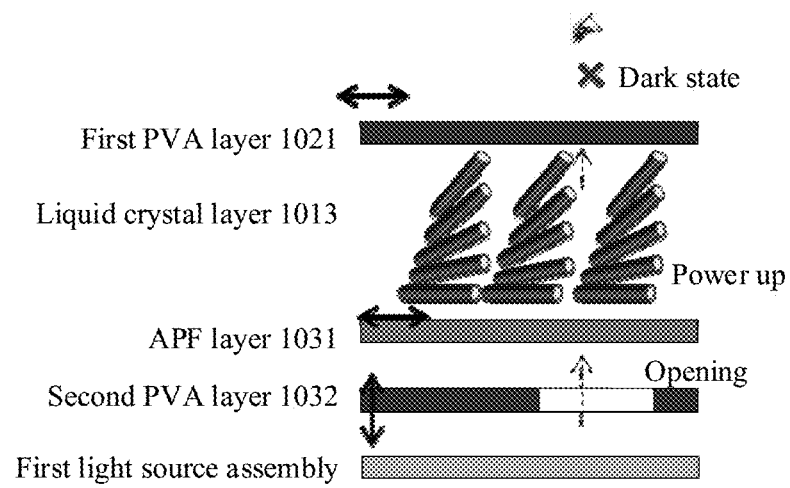
FIG. 21 is an optical path diagram provided by an embodiment of the present application in a case that an opening is designed in a second polarizing layer and a constantly black mode display panel of an IPS liquid crystal cell is powered up.

Referring to FIGS. 20 and 21, for the position of the second polarizing layer 1032 with no openings, regardless of whether the liquid crystal layer 1013 is powered up or not, after the light emitted from the first light source assembly located on the side of the second polarizing assembly 103 that is further away from the liquid crystal cell 101 passes through the second polarizing layer 1032, polarized light whose polarization direction is parallel to the third transmission axis is generated and the polarized light is irradiated to the transflective layer 1031. Since the second transmission axis of the transflective layer 1031 is perpendicular to the third transmission axis, the polarized light cannot pass through the transflective layer 1031.

Referring to FIG. 20, for position of the opening of the second polarizing layer 1032, in the case that the liquid crystal layer 1013 is not powered up, light from the first light source assembly located on the side of the second polarizing assembly 103 further away from the liquid crystal cell 101 is irradiated to the semi-transparent and semi-reflective film layer through the opening of the second polarizing layer 1032. The transflective layer 1031 generates polarized light (assumed to be refers to as a first polarized light, which is linearly polarized light) parallel to the second transmission axis based on the light transmitted through the opening of the second polarizing layer 1032. The first polarized light is changed to a second polarized light after passing through the IPS liquid crystal cell 101 (since the liquid crystal cell does not function when not being powered up, the second polarized light and the first polarized light have the same polarization direction), and the polarization direction of the second polarized light is parallel to the first transmission axis of the first polarization layer 1021, and the light can be emitted and is in a bright state.

Referring to FIG. 21, for the position of the opening of the second polarizing layer 1032, in the case that the liquid crystal layer 1013 is powered up, the light emitted from the first light source assembly located on the side of the second polarizing assembly 103 further away from the liquid crystal cell 101 is irradiated to the transflective layer 1031 through the opening of the second polarizing layer 1032. The transflective layer 1031 generates polarized light (assumed to be refers to as a first polarized light, which is linearly polarized light) parallel to the second transmission axis based on the light transmitted through the opening of the second polarizing layer 1032. The first polarized light is changed into a second polarized light (elliptically polarized light) after passing through the IPS liquid crystal cell 101. The polarization direction of the effective polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is perpendicular to the first transmission axis of the first polarized light layer 1021, no light comes out, and the light cannot enter the human eye and it is in a dark state.

It is to be noted that an IPS constantly black reflection mode may refer to that the light emitted from the external ambient light cannot exit through the position with no openings. In this case, the display panel is in the IPS constantly black reflection mode. Moreover, the light emitted from the first light source assembly located on the side of the second polarizing assembly 103 further away from the liquid crystal cell 101 can exit through the opening a provided in the second polarizing layer 1032 (the transmission is in the constantly white mode). Where, the IPS constantly black reflection mode as well as the transmission constantly white mode cannot be used at the same time.

In addition, if the IPS liquid crystal cell is in an IPS constantly white reflection mode (no light emitted by external ambient light can be emitted through the position with no openings), the display panel is in the IPS constantly white reflection mode. Moreover, the light emitted from the first light source assembly located on the side of the second polarizing assembly 103 further away from the liquid crystal cell 101 cannot be emitted through the opening a provided in the second polarizing layer 1032 (the transmission is in the constantly black mode). Where, the IPS constantly white reflection mode as well as the transmission constantly black mode cannot be used at the same time.

Taking the constantly white reflection mode of the VA liquid crystal cell 101 as an example, the light path is described as follows.

Figure 22:
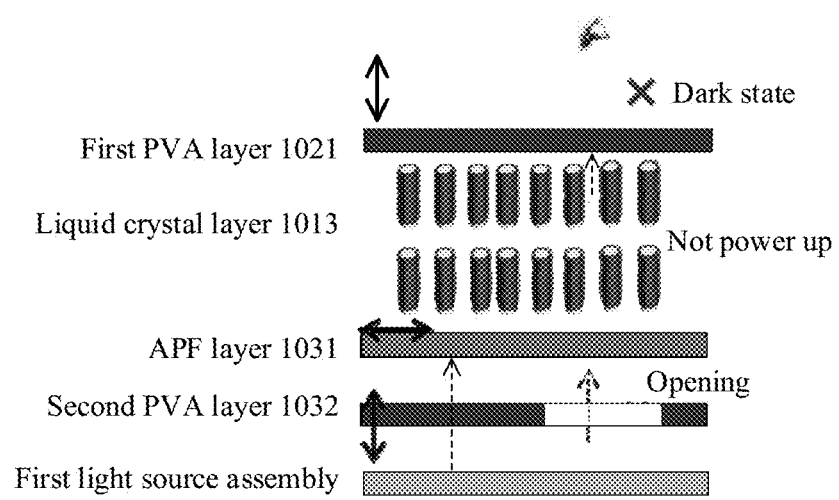
FIG. 22 is an optical path diagram provided by an embodiment of the present application in a case that an opening is designed in a second polarizing layer and a constantly black mode display panel of a VA liquid crystal cell is not powered up.
Figure 23:
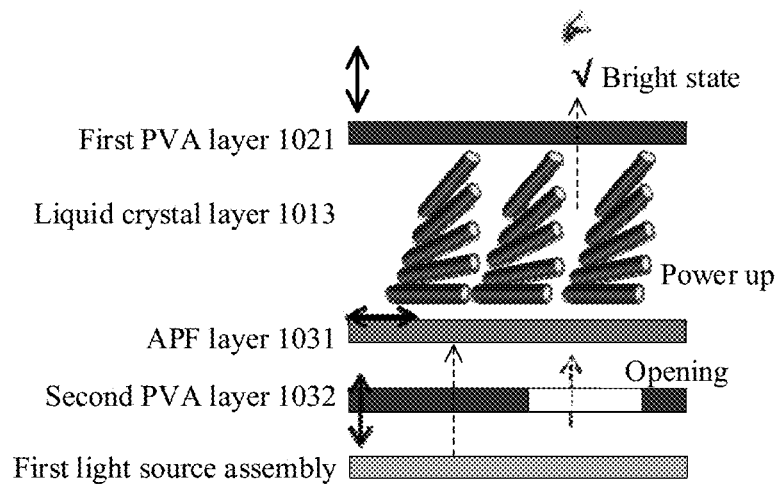
FIG. 23 is an optical path diagram provided by an embodiment of the present application in a case that an opening is designed in a second polarizing layer and a constantly black mode display panel of a VA liquid crystal cell is powered up.

Referring to FIGS. 22 and 23, for the position of the second polarizing layer 1032 with no openings, regardless of whether the liquid crystal layer 1013 is powered up or not, after the light emitted from the first light source assembly located on the side of the second polarizing assembly 103 that is further away from the liquid crystal cell 101 passes through the second polarizing layer 1032, polarized light whose polarization direction is parallel to the third transmission axis is generated and the polarized light is irradiated to the transflective layer 1031. Since the second transmission axis of the transflective layer 1031 is perpendicular to the third transmission axis, the polarized light cannot pass through the transflective layer 1031.

Referring to FIG. 22, for the position of the opening of the second polarizing layer 1032, in the case that the liquid crystal layer 1013 is not powered up, the light emitted from the first light source assembly located on the side of the second polarizing assembly 103 further away from the liquid crystal cell 101 is irradiated to the transflective layer 1031 through the opening of the second polarizing layer 1032. The transflective layer 1031 generates polarized light (assumed to be refers to as a first polarized light, which is linearly polarized light) parallel to the second transmission axis based on the light transmitted through the opening of the second polarizing layer 1032, and the first polarized light changes to a second polarized light after passing through the VA liquid crystal cell 101 (since the liquid crystal cell does not function when not being powered up, the second polarized light and the first polarized light have the same polarization direction). The polarization direction of the second polarized light is perpendicular to the first transmission axis of the first polarizing layer 1021, no light comes out, and the light cannot enter the human eye and is in a dark state.

Referring to FIG. 23, for the position of the opening of the second polarizing layer 1032, in the case that the liquid crystal layer 1013 is powered up, the light emitted from the first light source assembly located on the side of the second polarizing assembly 103 further away from the liquid crystal cell 101 is irradiated through the opening of the second polarizing layer 1032 to the transflective layer 1031. The transflective layer 1031 generates polarized light (assumed to be referred to as first polarized light, which is the linearly polarized light) parallel to the second transmission axis based on the light transmitted through the opening of the second polarizing layer 1032, and the first polarized light is changed to a second polarized light (elliptically polarized light) after passing through the VA liquid crystal cell 101. The polarization direction of the effective polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is parallel to the first transmission axis of the first polarized layer 1021, and the light can come out and is in a bright state.

It is noted that the VA constantly white reflection mode may refer to that light emitted from external ambient light can exit through the position with no openings. In this case, the display panel is in the VA constantly white reflection mode. Moreover, the light emitted from the first light source assembly located on the side of the second polarizing assembly 103 further away from the liquid crystal cell 101 cannot exit through the opening a provided in the second polarizing layer 1032 (the transmission is in the constantly black mode). Where, the VA constantly white reflection mode as well as the transmission constantly black mode cannot be used at the same time. It may be the constantly white reflection mode in the case that the external ambient light is abundant (e.g., daytime) and it may be the constantly black transmission mode in the case that the external ambient light is darker (e.g., nighttime).

Alternatively, a VA constantly black reflection mode may refer to that light emitted from the external ambient light may exit through the position with no openings. In this case, the display panel is in the VA constantly black reflection mode. Moreover, the light emitted from the first light source assembly located on the side of the second polarizing assembly 103 further away from the liquid crystal cell 101 cannot exit through the opening a provided in the second polarizing layer 1032 (the transmission is in the constantly black mode). Where, the VA constantly black reflection mode as well as the transmission white mode cannot be used at the same time.

Figure 24:
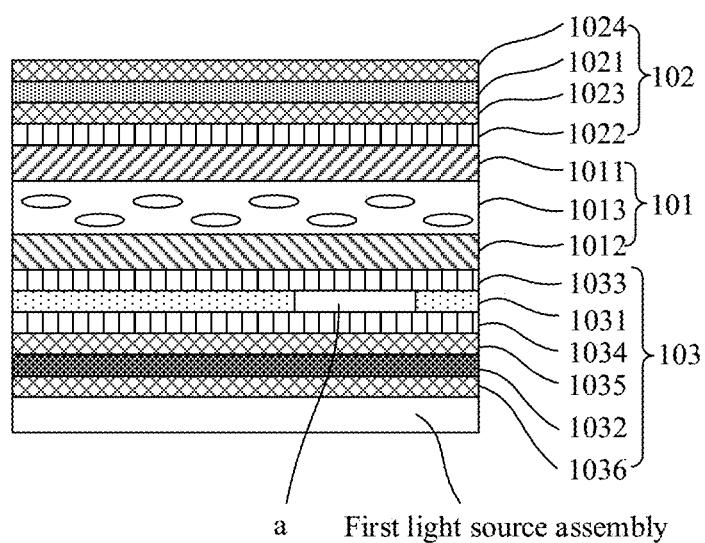
FIG. 24 is a structural schematic diagram of display panel in which an opening is designed in a transflective layer provided by an embodiment of the present application.

In a second manner, referring to FIG. 24, the transflective layer 1031 has a plurality of openings a. The second polarizing layer 1032 is configured to generate polarized light whose polarization direction is parallel to the third transmission axis based on light emitted from the first light source assembly. The openings a in the transflective layer 1031 are configured to transmit the polarized light.

Taking the constantly white reflection mode of the TN liquid crystal cell 101 as an example, the light path is described as follows.

Figure 25:
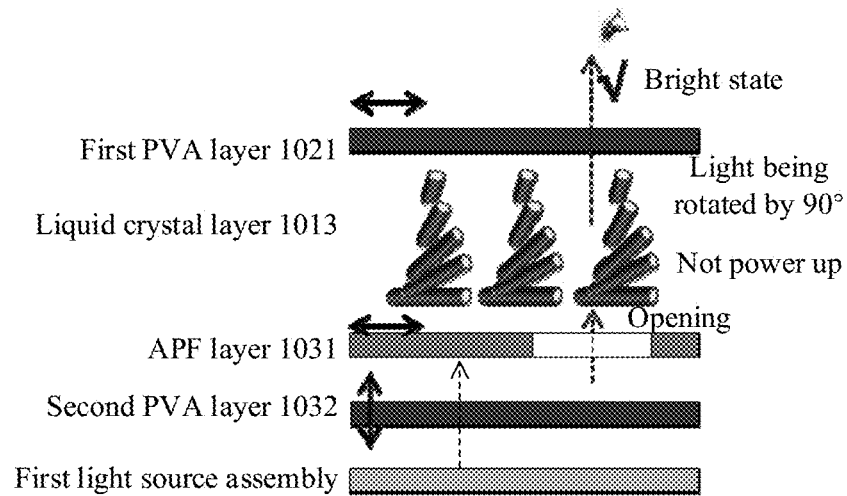
FIG. 25 is an optical path diagram provided by an embodiment of the present application in a case that an opening is designed in a transflective layer and a constantly white mode display panel of a TN liquid crystal cell is not powered up.
Figure 26:
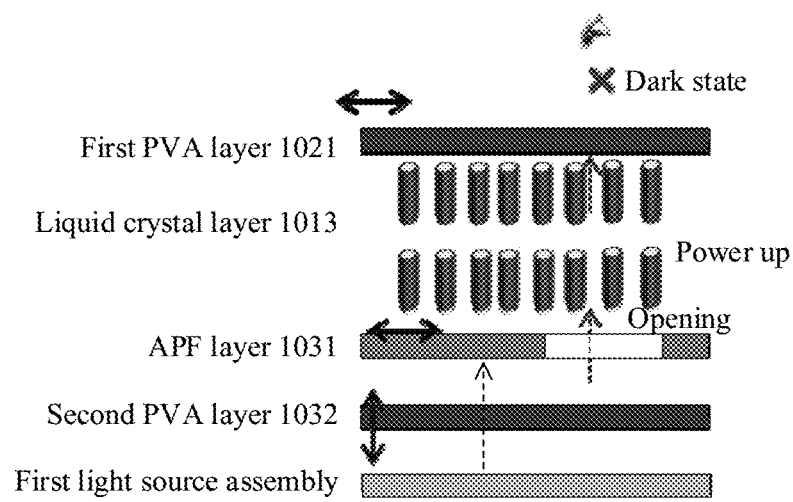
FIG. 26 is an optical path diagram provided by an embodiment of the present application in a case that an opening is designed in a transflective layer and a constantly white mode display panel of a TN liquid crystal cell is powered up.

Referring to FIGS. 25 and 26, for the position of the transflective layer 1031 with no openings, regardless of whether the liquid crystal layer 1013 is powered up or not, the light emitted from the first light source assembly located on the side of the second polarizing assembly 103 that is further away from the liquid crystal cell 101 passes through the second polarizing layer 1032 and generates the polarized light whose polarization direction is parallel to the third transmission axis. The first polarized light is irradiated to the transflective layer 1031, and since the second transmission axis of the transflective layer 1031 is perpendicular to the third transmission axis, this polarized light cannot pass through the transflective layer 1031.

Referring to FIG. 25, for the position of the opening of the transflective layer 1031, in the case that the liquid crystal layer 1013 is not powered up, when the light emitted from the first light source assembly located on the side of the second polarizing assembly 103 further away from the liquid crystal cell 101 is irradiated to the second polarizing layer 1032, the second polarizing layer 1032 may generate polarized light (assumed to be refers to as a first polarized light, which is linearly polarized light) with a polarization direction parallel to the third axis of transmittance. The first polarized light is incident to the TN liquid crystal cell 101 through the opening of the transflective layer 1031, and the polarization direction of the first polarized light is rotated by 90° after passing through the TN liquid crystal cell 101 to obtain a second polarized light (linearly polarized light). The polarization direction of the second polarized light is parallel to the first transmission axis of the first polarization layer 1021, and the light can be emitted and is in a bright state.

Referring to FIG. 26, for the position of the opening of the transflective layer 1031, in the case that the liquid crystal cell 1013 is powered up, when light from the first light source assembly located on the side of the second polarizing assembly 103 further away from the liquid crystal cell 101 is irradiated to the second polarizing layer 1032, the second polarizing layer 1032 can generate polarized light with a polarization direction parallel to the third transmission axis (assumed to be refers to as a first polarized light, which is linearly polarized light). The polarization direction of the first polarized light remains unchanged after the first polarized light passes through the TN liquid crystal cell 101 and remains as the first polarized light. The polarization direction of the first polarized light is perpendicular to the first transmission axis of the first polarizing layer 1021, and no light is emitted, so the light cannot enter the human eye and is in a dark state.

It is to be noted that the TN constantly white reflection mode may refer to that light emitted from external ambient light can exit through the position with no openings. In this case, the display panel is in the TN constantly white reflection mode. Moreover, the light emitted from the first light source assembly located on the side of the second polarizing assembly 103 further away from the liquid crystal cell 101 can exit through the opening a provided in the transflective layer 1031 (the transmission is in the constantly white reflection mode). The TN constantly white reflection mode as well as the transmission constantly white mode may be used simultaneously.

In addition, if the TN liquid crystal cell is in the TN constantly black reflection mode (the light emitted by the external ambient light cannot be emitted through the position with no openings), the display panel is in the TN constantly black reflection mode. Moreover, the light emitted from the first light source assembly located on the side of the second polarizing assembly 103 further away from the liquid crystal cell 101 cannot exit through the opening a provided in the transflective layer 1031 (the transmission is in the constantly black reflection mode). Where, the TN constantly black reflection mode as well as the transmission constantly black mode can be used simultaneously.

Taking the constantly black reflection mode of the IPS liquid crystal cell 101 as an example, the light path is described as follows.

Figure 27:
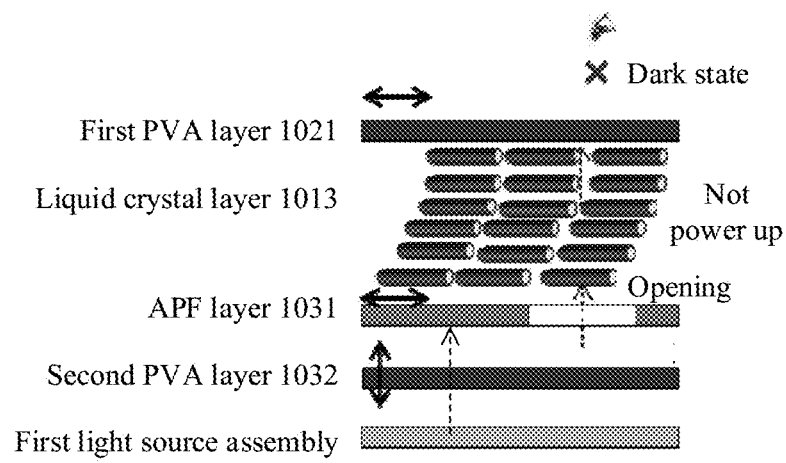
FIG. 27 is an optical path diagram provided by an embodiment of the present application in a case that an opening is designed in a transflective layer and a constantly black mode display panel of an IPS liquid crystal cell is not powered up.
Figure 28:
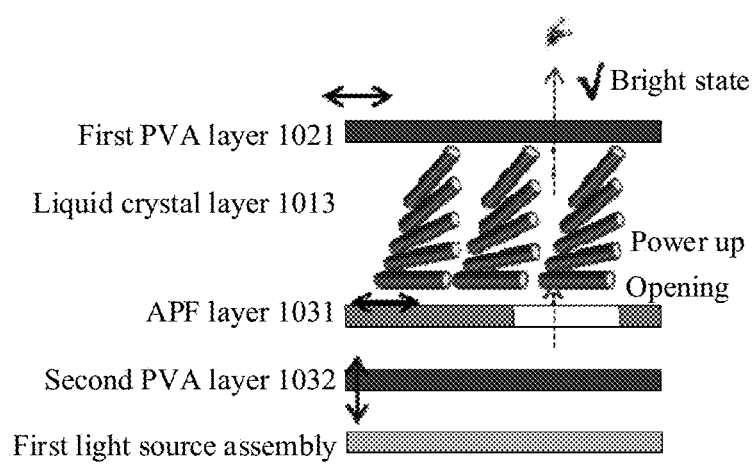
FIG. 28 is an optical path diagram provided by an embodiment of the present application in a case that an opening is designed in a transflective layer and a constantly black mode display panel of an IPS liquid crystal cell is powered up.

Referring to FIGS. 27 and 28, for the position of the transflective layer 1031 with no openings, regardless of whether the liquid crystal layer 1013 is powered up or not, after the light emitted from the first light source assembly located on the side of the second polarizing assembly 103 that is further away from the liquid crystal cell 101 passes through the second polarizing layer 1032, polarized light whose polarization direction is parallel to the third transmission axis is generated and the polarized light is irradiated to the transflective layer 1031. Since the second transmission axis of the transflective layer 1031 is perpendicular to the third transmission axis, the polarized light cannot pass through the transflective layer 1031.

Referring to FIG. 27, for the position of the opening of the transflective layer 1031, in the case that the liquid crystal layer 1013 is not powered up, when light from the first light source assembly located on the side of the second polarizing assembly 103 further away from the liquid crystal cell 101 is irradiated to the second polarizing layer 1032, the second polarizing layer 1032 can generate polarized light (assumed to be refers to as a first polarized light, which is linearly polarized light) with polarization direction is parallel to the third transmission axis. The first polarized light is incident to the IPS liquid crystal cell 101 through the opening of the transflective layer 1031, and the first polarized light is changed to the second polarized light after passing through the IPS liquid crystal cell 101 (since the liquid crystal cell does not function when not being powered up, the second polarized light and the first polarized light have the same polarization direction). The polarization direction of the second polarized light is perpendicular to the first transmission axis of the first polarizing layer 1021, no light comes out, and the light cannot enter the human eye and is in a dark state.

Referring to FIG. 28, for the position of the opening of the transflective layer 1031, in the case that the liquid crystal layer 1013 is powered up, when the light emitted from the first light source assembly located on the side of the second polarizing assembly 103 further away from the liquid crystal cell 101 is irradiated to the second polarizing layer 1032, the second polarizing layer 1032 can generate the polarized light (assumed to be refers to as a first polarized light, which is linearly polarized light) with polarization direction is parallel to the third axis of transmittance. The first polarized light changes to the second polarized light (elliptically polarized light) after passing through the IPS liquid crystal cell 101. The polarization direction of the effective polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is parallel to the first transmission axis of the first polarized layer 1021, and the light can come out and is in a bright state.

It is to be noted that the IPS constantly black reflection mode may refer to that the light emitted from the external ambient light cannot exit through the position with no openings. In this case, the display panel is in the IPS constantly black reflection mode. Moreover, the light emitted from the first light source assembly located on the side of the second polarizing assembly 103 further away from the liquid crystal cell 101 cannot exit through the opening a provided in the transflective layer 1031 (the transmission is in the constantly black reflection mode). Where, the IPS constantly black reflection mode as well as the transmission constantly black mode can be used simultaneously.

In addition, if the IPS liquid crystal cell is in the IPS constantly white reflection mode (the light emitted from the external ambient light can exit through the position with no openings), the display panel is in the IPS constantly white reflection mode. Moreover, the light emitted from the first light source assembly located on the side of the second polarizing assembly 103 further away from the liquid crystal cell 101 can exit through the opening a provided in the transflective layer 1031 (the transmittance is in the constantly white reflection mode). Where, the IPS constantly white reflection mode as well as the transmission constantly white mode may be used simultaneously.

Taking the constantly white reflection mode of the VA liquid crystal cell 101 as an example, the light path is described as follows.

Figure 29:
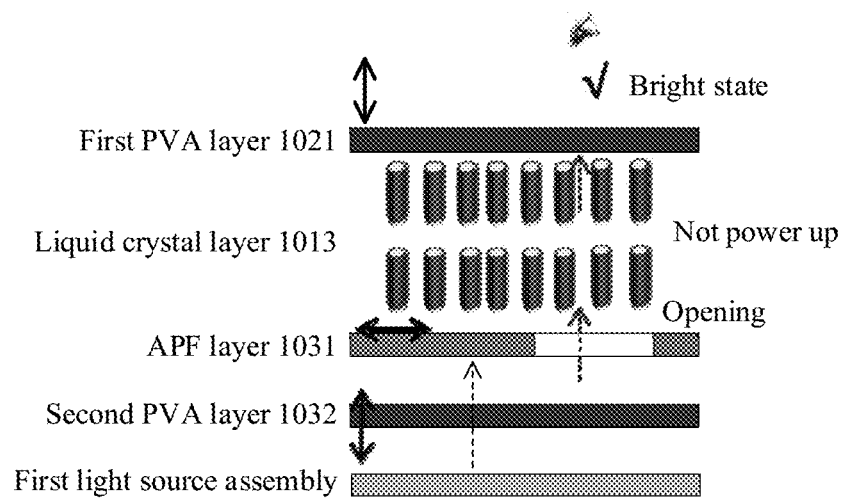
FIG. 29 is an optical path diagram provided by an embodiment of the present application in a case that an opening is designed in a transflective layer and a constantly black mode display panel of a VA liquid crystal cell is not powered up.
Figure 30:
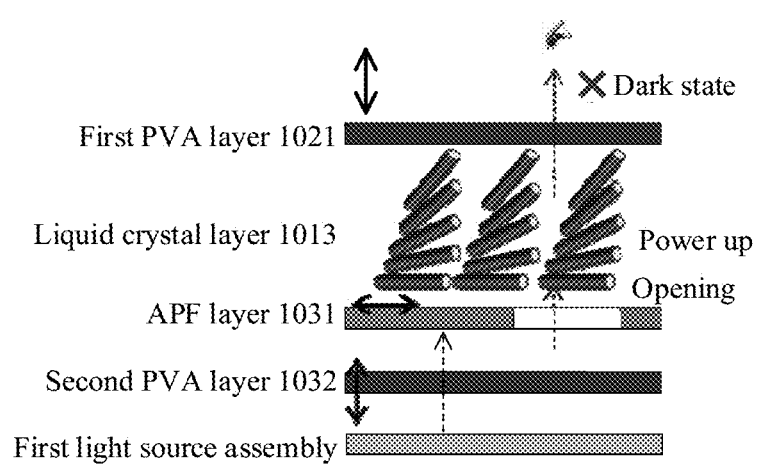
FIG. 30 is an optical path diagram provided by an embodiment of the present application in a case that an opening is designed in a transflective layer and a constantly black mode display panel of a VA liquid crystal cell is powered up.

Referring to FIGS. 29 and 30, for the position of the transflective layer 1031 with no openings, regardless of whether the liquid crystal layer 1013 is powered up or not, after the light emitted from the first light source assembly located on the side of the second polarizing assembly 103 that is further away from the liquid crystal cell 101 passes through the second polarizing layer 1032, polarized light whose polarization direction is parallel to the third transmission axis is generated and the polarized light is irradiated to the transflective layer 1031. Since the second transmission axis of the transflective layer 1031 is perpendicular to the third transmission axis, the polarized light cannot pass through the transflective layer 1031.

Referring to FIG. 29, for the position of the opening of the transflective layer 1031, in the case that the liquid crystal layer 1013 is not powered up, when light from the first light source assembly located on the side of the second polarizing assembly 103 further away from the liquid crystal cell 101 is irradiated to the second polarizing layer 1032, the second polarizing layer 1032 can generate polarized light (assumed to be refers to as a first polarized light, which is linearly polarized light) with a polarization direction parallel to the third transmission axis. The first polarized light is incident to the VA liquid crystal cell 101 through the opening of the transflective layer 1031, and the first polarized light changes to a second polarized light after passing through the VA liquid crystal cell 101 (since the liquid crystal cell does not function when not being powered up, the second polarized light and the first polarized light have the same polarization direction). The polarization direction of the second polarized light is parallel to the first transmission axis of the first polarization layer 1021, and the light can be emitted and is in a bright state.

Referring to FIG. 30, for the position of the opening of the transflective layer 1031, in the case that the liquid crystal layer 1013 is powered up, when the light emitted from the first light source assembly located on the side of the second polarizing assembly 103 further away from the liquid crystal cell 101 is irradiated to the second polarizing layer 1032, that second polarizing layer 1032 can generate polarized light (assumed to be refers to as a first polarized light, which is linearly polarized light) with polarization direction parallel to the third transmission axis. The first polarized light changes to a second polarized light (elliptically polarized light) after passing through the VA liquid crystal cell 101. The polarization direction of effective polarized light (the elliptically polarized light can be decomposed into the polarized components of two linearly polarized light perpendicular to each other, the linearly polarized light of the larger component is defined as the effectively polarized light and the polarization direction of the linearly polarized light of the larger component is the polarization direction of the effectively polarized light) of the second polarized light is perpendicular to the first transmission axis of the first polarized light layer 1021, no light comes out, and the light cannot enter the human eye and is in a dark state.

It is to be noted that the VA constantly white reflection mode may refer to that light emitted from external ambient light can exit through the position with no openings. In this case, the display panel is in the VA constantly white reflection mode. Moreover, the light emitted from the first light source assembly located on the side of the second polarizing assembly 103 further away from the liquid crystal cell 101 can exit through the opening a provided in the transflective layer 1031 (the transmission is in the constantly white mode). Where, the VA constantly white reflection mode as well as the transmission constantly white mode may be used simultaneously.

In addition, if the VA liquid crystal cell is in the VA constantly black reflection mode (light emitted by external ambient light cannot exit through the position with no openings), the display panel is in the VA constantly black reflection mode. Moreover, the light emitted from the first light source assembly located on the side of the second polarizing assembly 103 further away from the liquid crystal cell 101 is unable to exit through the opening a provided in the transflective layer 1031 (transmissive for constantly black mode). Where, the VA constantly black reflection mode as well as the transmissive constantly black mode can be used at the same time.

Compared to the scheme of designing an opening in the second polarizing layer 1032, the scheme of designing an opening in the transflective layer 1031 sacrifices a portion of the reflective area of the transflective layer 1031, reduces the reflective effect of the light reflecting the display side of the reflective display panel, and may have a little effect on the display effect.

It should be noted that the bidirectional arrows in FIGS. 5 to 16 are all configured to indicate the direction of the light rays, and the dashed single arrow is configured to indicate the light path of the light rays. That two of the bi-directional arrows intersect indicates that the direction of the light is in multiple directions, and one of the bi-directional arrows indicates the polarization direction of the polarized light. The bidirectional arrows in FIGS. 18 to 23 and FIGS. 25 to 30 are configured to indicate the direction of light transmission of the transmission axis, and the dashed single arrow is configured to indicate the light ray.

Figure 31:
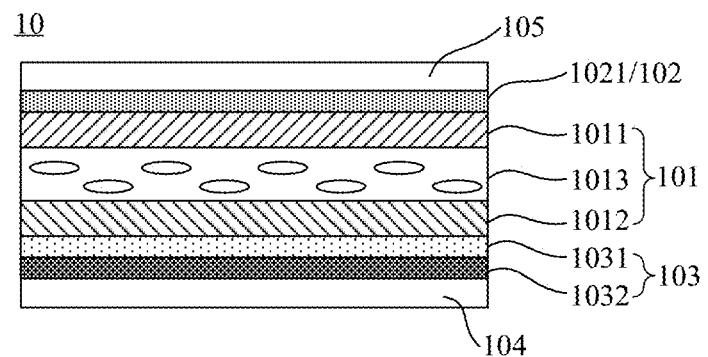
FIG. 31 is a structural schematic diagram of yet another display panel provided by an embodiment of the present application.
Figure 32:
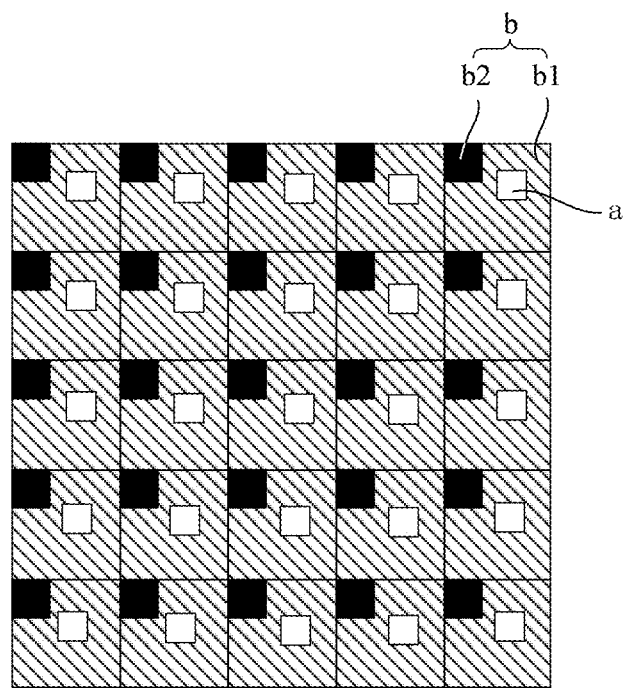
FIG. 32 is schematic diagram of a positional relationship among an array substrate and openings provided by an embodiment of the present application.

In an embodiment of the present application, FIG. 31 is a schematic diagram of the structure of another display panel provided by an embodiment of the present application. Referring to FIG. 31, the display panel 10 further includes an array substrate 104 having a plurality of pixel circuits. Referring to FIG. 32, the array substrate 104 may have a plurality of pixel regions b, each pixel region b includes a display region b1 as well as a non-display region b2, and the pixel circuits are disposed in the non-display region b2. An orthographic projection in the array substrate 104 of each opening a in the second polarizing layer 1032 or the transflective layer 1031 is located in a display region b1 of a pixel region b.

Optionally, an optical film (e.g., the second polarizing assembly 103 is an optical film) is typically affixed without alignment markings and the precision is generally low, and it only requires the opening a not to deviate from the display region b1 of the pixel region b. For example, if the pixel size is 150 μm (micrometers)*150 μm and the opening size is 50 um*50 um, it is sufficient to satisfy the alignment accuracy= (150+50)/2=100 μm. For another example, if the pixel size is 200 um*200 μm and the opening size is 40 um*40 um, the alignment accuracy=(200+40)/2=120 um.

Since the opening a is provided in the second polarizing layer 1032 or the transflective layer 1031, it is independent of the pixel design of the array substrate 104, and will not be affected by the process related to the array substrate 104, and the cost is lower. And since the design of the opening a is independent of the structure of the array substrate 104, the above embodiments only schematically illustrate the design of display panels corresponding to the TN liquid crystal cell 101, the IPS liquid crystal cell 101, and the VA liquid crystal cell 101, but other types of LCD cells may be actually applied.

Optionally, the array substrate 104 may include a substrate and a driving circuit layer. The substrate includes a glass substrate or a quartz substrate, the driving circuit layer includes a plurality of pixel circuits as described above as well as a plurality of pixel electrodes. The plurality of pixel circuits includes a plurality of data lines, a plurality of scanning lines and a plurality of thin film transistors. The driving circuit layer is capable of providing different polarization voltages to the liquid crystal molecules of the liquid crystal cell 101 according to different display data. The liquid crystal molecules in the liquid crystal cell 101 can realize different degrees of deflection under different deflection voltages, thereby realizing different transmittance.

In addition to this, the display panel 10 further includes a color film substrate 105 which includes a plurality of color-resistive blocks corresponding to sub-pixels of different colors. For example, it includes a red color block corresponding to a red (red, R) sub-pixel, a green color block corresponding to a green (green, G) sub-pixel, and a blue color block corresponding to a blue (blue, B) sub-pixel. Since the transmittances of the light emitted from the sub-pixels of different colors are different, ratios of red light, green light and blue light transmitted through the corresponding color block are different, thereby realizing a color display.

In embodiments of the present application, as a second optional implementation, the material of the light absorbing layer 1032 includes a light absorbing material. The light absorbing material may include black ink.

The black ink is a material with high light absorption. Optionally, the black ink includes a resin. The black ink is made by mixing the resin with a black pigment and a mixed material such as a solvent. It should be noted that the black ink may be provided on the backplane in addition to being provided on the side of the transflective layer 1031 further away from the liquid crystal cell 101. By providing the black ink in the embodiment of the present application, it can not only absorb the light transmitted from the transflective layer 1031, but also have a simple production process and a low cost.

Figure 33:
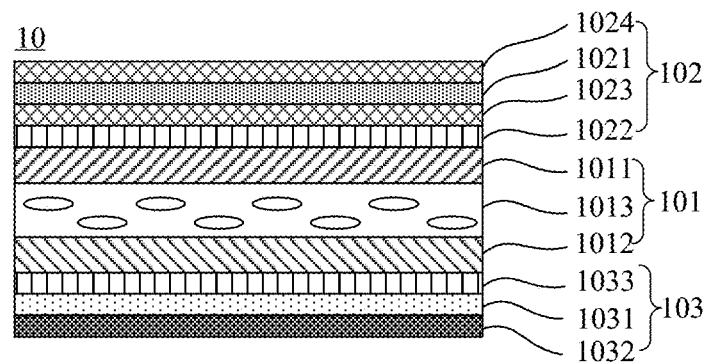
FIG. 33 is a structural schematic diagram of yet another display panel provided by an embodiment of the present application.

Optionally, referring to FIG. 33, the second polarizing assembly 103 further includes a second adhesive layer 1033, which is disposed on a side of the transflective layer 1031 closer to the liquid crystal cell 101. The second adhesive layer 1033 may be configured to bond the transflective layer 1031 to the second substrate 1012. That is, in the case that the material of the light absorbing layer 1032 includes a light absorbing material, two protective layers (e.g., the third protective layer 1035 and the fourth protective layer 1036 in the first implementation) may not need to be designed.

In the case that the material of the light absorbing layer 1032 includes a light absorbing material, the light can be absorbed by the light absorbing layer 1032 regardless of the type of light irradiated onto the light absorbing layer 1032 and regardless of the direction of light irradiated from. For example, light rays on the display side of the display panel 10 are polarized after passing through the first polarizing assembly 102, the liquid crystal cell 101, and the transflective layer 1031, and the polarized light rays are irradiated to the light absorbing layer 1032 and absorbed by the light absorbing layer 1032. Further, for example, the light emitted from the first light source assembly located on the side of the second polarizing assembly 103 further away from the liquid crystal cell 101 is irradiated to the light absorbing layer 1032 and is absorbed by the light absorbing layer 1032.

Thus, in the case that the material of the light absorbing layer 1032 includes a light absorbing material, if it is necessary for the light emitted from the first light source module located on the side of the second polarizing module 103 further away from the liquid crystal cell 101 to be utilized, it must design an opening in the light absorbing layer 1032 rather than design an opening in the transflective layer 1031. Reference may be made to the above descriptions related to designing an opening in the second polarizing layer 1032 for the light path design explanations, and they will not be repeated in the embodiments of the present application herein.

In the embodiments of the present application, all of the above solutions are capable of realizing a reflective effect, but for a reflective display panel, it is necessary to ensure a diffuse reflective effect in order to improve the display effect of the display panel 10. It is common in the related technology to make a concave-convex structure in the reflective metal layer, or to add a scattering film layer in the first polarizing assembly 102. However, both of these solutions are more costly and the process is more complicated.

Accordingly, in an embodiment of the present application, at least one adhesive layer between the transflective layer 1031 and an out-light surface is performed with a haze (Haze) treatment, and the adhesive layer subjected to the haze treatment can realize diffuse reflection of light. By performing the haze treatment to the at least one adhesive layer between the transflective layer 1031 and the out-light surface, the light reflected from the transflective layer 1031 can be made to pass through the at least one adhesive layer and then be emitted from the out-light surface, thereby ensuring the effect of diffuse reflection. Where the out-light surface is a side of the first polarizing assembly 102 further away from the liquid crystal cell 101.

In the first implementation and the second implementation described above, the adhesive layer between the transflective layer 1031 and the out-light surface of the display panel 10 includes a first adhesive layer 1022 and a second adhesive layer 1033. Thus, the following three solutions are possible: 1. the first adhesive layer 1022 is subjected to the haze treatment, and the second adhesive layer 1033 is not subjected to the haze treatment; 2. the first adhesive layer 1022 is not subjected to the haze treatment and the second adhesive layer 1033 is subjected to the haze treatment; 3. both the first adhesive layer 1022 and the second adhesive layer 1033 are subjected to the haze treatment.

Optionally, the haze treatment may range from 10% to 90%, and the larger the haze treatment value, the better the diffuse reflection. However, a larger haze treatment value may affect the contrast of the display panel. Thus, the diffuse reflection effect and the contrast may be considered in the embodiments of the present application so to select a suitable haze processing value, for example, the haze processing value may be 80%.

In the first solution described above (the first adhesive layer 1022 is subjected to the haze treatment, and the second adhesive layer 1033 is not subjected to the haze treatment), the first adhesive layer 1022, which has been subjected to the haze treatment, in the first polarizing assembly 102 is bonded to the first substrate 1011 of the liquid crystal cell 101. In the second solution described above (the first adhesive layer 1022 is not subjected to the haze treatment and the second adhesive layer 1033 is subjected to the haze treatment), the second adhesive layer 1033, which has been subjected to the haze treatment, in the second polarizing assembly 103 is bonded to the second substrate 1012 of the liquid crystal cell 101. In the third solution described above (both the first adhesive layer 1022 and the second adhesive layer 1033 are subjected to the haze treatment), the first adhesive layer 1022, which has been subjected to the haze treatment, in the first polarizing assembly 102 is bonded to the first substrate 1011 of the liquid crystal cell 101, and the second adhesive layer 1033, which has been subjected to the haze treatment, in the second polarizing assembly 103 is bonded to the second substrate 1012 of the liquid crystal cell 101. In addition, after relevant testing, it was found that the display panel of the second embodiment described above has a superior contrast ratio.

Figure 34:
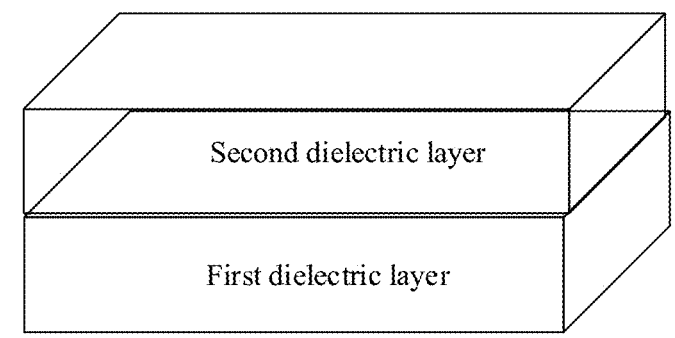
FIG. 34 is a structural schematic diagram of a transflective layer provided by an embodiment of the present application.
Figure 34:
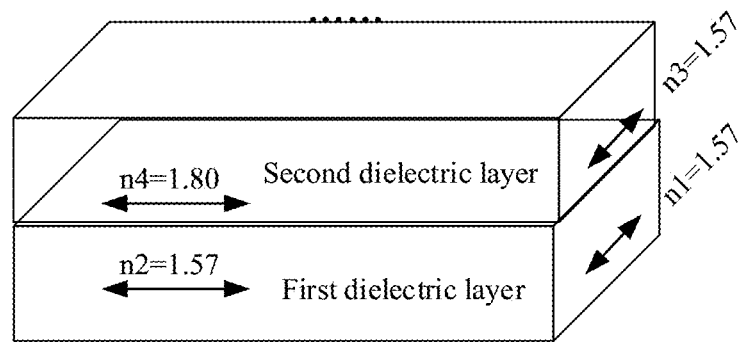

In an embodiment of the present application, referring to FIG. 34, the transflective layer 1031 may include a first dielectric layer and a second dielectric layer which are alternately stacked in sequence.

The first dielectric layer has a first refractive index for polarized light whose polarization direction is parallel to the second transmission axis, and has a second refractive index for polarized light whose polarization direction is perpendicular to the second transmission axis. The first refractive index is equal to the second refractive index. That is, with reference to FIGS. 34 and 35, the first dielectric layer is a uniform dielectric layer. A refractive index n1 of the first dielectric layer for the polarized light whose polarization direction is parallel to the first direction X and a refractive index n2 of the first dielectric layer for the polarized light whose polarization direction is parallel to the second direction Y are the same. For example, n1=n2=1.57. The first direction X is parallel to the second transmission axis, and the second direction Y is perpendicular to the second transmission axis.

The second dielectric layer has a third refractive index for polarized light whose polarization direction is parallel to the second transmission axis and a fourth refractive index for polarized light whose polarization direction is perpendicular to the second transmission axis. The third refractive index and the fourth refractive index are not equal, and the third refractive index is equal to the first refractive index. That is, with reference to FIGS. 34 and 35, the second dielectric layer is a birefringent dielectric layer, and a refractive index n3 for the polarized light whose polarization direction is parallel to the first direction X is different from a refractive index n4 for the polarized light whose polarization direction is parallel to the second direction Y. For example, n3=1.57 and n4=1.8.

The first dielectric layer may be referred to as a non-directional layer and the second dielectric layer may be referred to as a directional layer.

Figure 35:
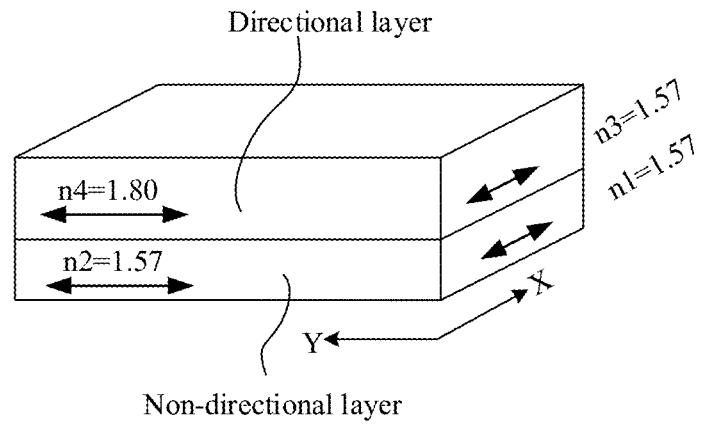
FIG. 35 is a schematic diagram of refractive indexes of a first dielectric layer and a second dielectric layer of a transflective layer provided by an embodiment of the present application.

Based on the above principles, the transflective layer is capable of realizing that light in a certain polarization direction can be transmitted and light in another polarization direction is completely reflected. As shown in FIG. 35, the transflective layer 1031 is capable of transmitting the polarized light whose polarization direction is parallel to the first direction X, and reflecting the polarized light whose polarization direction is parallel to the second direction Y.

Since the polarized light can be completely reflected back by the transflective layer, and there is no problem of dispersion of the ½λ wavelength sheet and the ¼λ wavelength sheet, not only the display brightness but also the display contrast can be improved. Moreover, by reflecting the polarized light by the transflective layer, the fabrication of a reflective metal layer can be avoided, thereby simplifying the fabrication process of the display panel.

Moreover, the display panel provided by embodiments of the present application can avoid the problem of light leakage due to the dispersion of the ½λ wavelength sheet and the ¼λ wavelength sheet by using the PVA layer and the APF layer, and can improve the display contrast. In addition, the display panel provided by the embodiments of the present application avoids the use of the higher-cost ½λ waveplates and ¼λ waveplates, thereby reducing the production cost.

In summary, embodiments of the present application provide a display panel that includes a liquid crystal cell, a first polarizing assembly and a second polarizing assembly. The first polarizing assembly includes at least a first polarizing layer having a first transmission axis and is configured for generating polarized light with a polarization direction parallel to the first transmission axis. The second polarizing assembly includes at least a transflective layer and a light absorbing layer. The transflective layer has a second transmission axis and is configured for transmitting polarized light with polarization direction parallel to the second transmission axis and for reflecting polarized light with polarization direction perpendicular to the second transmission axis. The light absorbing layer is configured to absorb the polarized light transmitted by the transflective layer. The embodiments of the present application realize a reflective display panel by combining the first polarizing layer in the first polarizing assembly, and the transflective layer and the light absorbing layer in the second polarizing assembly, and thus the contrast of the display panel may be improved and the display panel may be prepared in batch at a lower cost.

Figure 36:
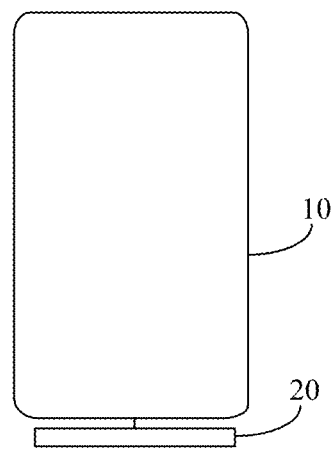
FIG. 36 is a structural schematic diagram of a display apparatus provided by an embodiment of the present application.

FIG. 36 is a schematic diagram of a structure of a display apparatus provided by embodiments of the present application. Referring to FIG. 36, the display apparatus may include a power supply assembly 20 and a display panel 10 as provided in the above embodiments. The power supply assembly 20 may be configured to power the display panel 10.

In addition, the display apparatus further includes, but is not limited to, components such as: an RF unit, a network module, an audio output unit, an input unit, a sensor, a display unit, a user input unit, an interface unit, a memory, a processor, and a power supply. It is understood by those skilled in the art that the structure of the display apparatus described above does not constitute a limitation of the display apparatus, and that the display apparatus may include more or fewer of the above-described components, or a combination of certain components, or a different arrangement of components. In embodiments of the present invention, the display apparatus includes, but is not limited to, a monitor, a cell phone, a tablet computer, a television, a wearable electronic device, a navigation display apparatus, and the like.

Optionally, the display apparatus may be: an LCD TV, an LCD monitor, a digital photo frame, a cellular phone, a tablet computer, and any other product or component having a display function, wherein the display apparatus also includes a flexible circuit board, a printed circuit board, and a backplane.

It is to be noted that each embodiment in this specification is described in a progressive manner, and it is sufficient to refer to each embodiment to each other for the same and similar portions of each embodiment, and each embodiment focuses on the differences from other embodiments. In particular, the embodiments are described in a simpler manner because they are substantially similar to the product embodiments, and it is sufficient to refer to portions of the product embodiments where relevant.

Unless otherwise defined, technical or scientific terms used in this disclosure shall have the ordinary meaning understood by a person of ordinary skill in the art to which this disclosure pertains. The terms "first," "second," and the like, as used in this disclosure, do not indicate any order, quantity, or importance, but are used only to distinguish between different components. The words "including" or "comprising" and the like are intended to mean that the component or object preceded by the word encompasses the component or object listed after the word and its equivalents, and does not exclude other components or objects. Words such as "connected" or "connected" are not limited to physical or mechanical connections, but may include electrical connections, whether direct or indirect. The words "up", "down", "left", "right", etc. are used only to indicate relative positional relationships. absolute position of the described object is changed, then that relative positional relationship may be changed accordingly.

It will be appreciated that when an element such as a layer, film, region, or substrate is the to be "on" or "under" another element, the element may be "directly" located "on" the other element. "on" or "under" another element, or there may be intermediate elements.

In the description of the above embodiments, specific features, structures, materials, or characteristics may be combined in any one or more embodiments or examples in a suitable manner.

The above description is only an optional embodiment of the present application and is not intended to limit the present application, and any modifications, equivalent substitutions, improvements, etc., made within the spirit and principles of the present application shall be included within the scope of protection of the present application.

The invention claimed is:

1. A display panel, comprising:
   a liquid crystal cell, wherein the liquid crystal cell comprises a first substrate and a second substrate disposed opposite to each other, and a liquid crystal layer disposed between the first substrate and the second substrate;
   a first polarizing assembly, wherein the first polarizing assembly is disposed on a side of the first substrate further away from the liquid crystal layer and comprises at least a first polarizing layer having a first transmission axis, and the first polarizing assembly is configured for generating polarized light whose polarization direction is parallel to the first transmission axis; and
   a second polarizing assembly, wherein the second polarizing assembly is located on a side of the second substrate further away from the liquid crystal layer and comprises at least a transflective layer and a light absorbing layer, the transflective layer is closer to the liquid crystal cell than the light absorbing layer, the transflective layer has a second transmission axis and the transflective layer is configured for transmitting polarized light whose polarization direction is parallel to the second transmission axis and for reflecting polarized light whose polarization direction is perpendicular to the second transmission axis, and the light absorbing layer is configured for absorbing polarized light transmitted by the transflective layer; and
   wherein the light absorbing layer is a second polarizing layer having an absorption axis and a third transmission axis, and the absorption axis is parallel to the second transmission axis and the third transmission axis is perpendicular to the second transmission axis.

2. The display panel according to claim 1, wherein the first polarizing assembly further comprises:
   a first adhesive layer located on a side of the first polarizing layer closer to the liquid crystal cell;
   a first protective layer located between the first adhesive layer and the first polarizing layer; and
   a second protective layer located on a side of the first polarizing layer further away from the liquid crystal cell; and
   wherein the first adhesive layer is configured to bond the first protective layer to the first substrate, and the first protective layer and the second protective layer are configured to protect two surfaces of the first polarizing layer, respectively.

3. The display panel according to claim 1, wherein the second polarizing assembly further comprises:
   a second adhesive layer located on a side of the transflective layer closer to the liquid crystal cell;
   a third adhesive layer located between the transflective layer and the second polarizing layer;
   a third protective layer located between the third adhesive layer and the second polarizing layer; and
   a fourth protective layer located on a side of the second polarizing layer further away from the liquid crystal cell; and
   wherein the second adhesive layer is configured to bond the transflective layer to the second substrate, the third adhesive layer is configured to bond the transflective layer to the third protective layer, and the third protective layer and the fourth protective layer are configured to protect two surfaces of the second polarizing layer, respectively.

4. The display panel according to claim 1, wherein the display panel further comprises a first light source assembly located on a side of the second polarizing assembly further away from the liquid crystal cell; and
   one of the second polarizing layer and the transflective layer has a plurality of openings which are configured for transmitting light of the first light source assembly.

5. The display panel according to claim 4, wherein the second polarizing layer has the plurality of openings;
   the plurality of openings in the second polarizing layer are configured for transmitting light emitted from the first light source assembly; and
   the transflective layer is configured for generating polarized light parallel to the second transmission axis based on light transmitted through the plurality of openings.

6. The display panel according to claim 4, wherein the transflective layer has the plurality of openings;
   the second polarizing layer is configured for generating polarized light with a polarization direction parallel to the third transmission axis based on light emitted from the first light source assembly; and
   the plurality of openings in the transflective layer are configured for transmitting polarized light with a polarization direction parallel to the third transmission axis.

7. The display panel according to claim 4, wherein the display panel further comprises an array substrate having a plurality of pixel circuits, the array substrate has a plurality of pixel regions, each of the plurality of pixel regions comprises a display area as well as a non-display area, each of the pixel circuits is disposed in the non-display area, and an orthographic projection in the array substrate of each of the plurality of openings is in one of the plurality of pixel regions.

8. The display panel according to claim 1, wherein a material of the light absorbing layer comprises a light absorbing material, and the light absorbing material comprises black ink.

9. The display panel according to claim 8, wherein the second polarizing assembly further comprises a second adhesive layer disposed on a side of the transflective layer closer to the liquid crystal cell; and
wherein the second adhesive layer is configured to bond the transflective layer to the second substrate.

10. The display panel according to claim 2, wherein a side of the first polarizing assembly further away from the liquid crystal cell is an out-light surface of the display panel, and at least one of adhesive layers between the transflective layer and the out-light surface is subjected to a haze treatment.

11. The display panel according to claim 10, wherein the adhesive layers between the transflective layer and the out-light surface of the display panel comprise the first adhesive layer and the second adhesive layer; and
a material of the first adhesive layer comprises at least diffusion powder, or a material of the second adhesive layer comprises at least the diffusion powder, or a material of both the first adhesive layer and the second adhesive layer comprises at least the diffusion powder.

12. The display panel according to claim 1, wherein the transflective layer comprises a first dielectric layer and a second dielectric layer which are alternately stacked in sequence;
the first dielectric layer has a first refractive index for polarized light whose polarization direction is parallel to the second transmission axis, the first dielectric layer has a second refractive index for polarized light whose polarization direction is perpendicular to the second transmission axis, and the first refractive index is equal to the second refractive index; and
the second dielectric layer has a third refractive index for polarized light whose polarization direction is parallel to the second transmission axis, the second dielectric layer has a fourth refractive index for polarized light whose polarization direction is perpendicular to the second transmission axis, the third refractive index and the fourth refractive index are unequal and the third refractive index is equal to the first refractive index.

13. The display panel according to claim 1, wherein the liquid crystal cell is a twisted nematic liquid crystal cell, or the liquid crystal cell is a planar conversion liquid crystal cell, or the liquid crystal cell is a multi-quadrant vertically oriented liquid crystal cell.

14. The display panel according to claim 1, wherein the first polarizing assembly is closer to an incoming light side than the second polarizing assembly;
light on the incoming light side comprises external ambient light, and/or, light emitted by a second light source assembly included in the display panel; and
the second light source assembly is located on a side of the first polarizing assembly further away from the liquid crystal cell.

15. A display apparatus, wherein the display apparatus comprises a power supply assembly and the display panel according to claim 1; and
wherein the power supply assembly is configured to supply power to the display panel.

* * * * *